(12) United States Patent
Sevindik

(10) Patent No.: US 12,107,662 B2
(45) Date of Patent: Oct. 1, 2024

(54) MASSIVE MIMO COMMUNICATION TECHNIQUE

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 302 days.

(21) Appl. No.: 17/404,668

(22) Filed: Aug. 17, 2021

(65) Prior Publication Data

US 2023/0054804 A1 Feb. 23, 2023

(51) Int. Cl.
*H04B 7/155* (2006.01)
*H04B 7/0413* (2017.01)
*H04B 7/06* (2006.01)
*H04W 72/20* (2023.01)

(52) U.S. Cl.
CPC ....... *H04B 7/15542* (2013.01); *H04B 7/0413* (2013.01); *H04B 7/0632* (2013.01); *H04W 72/20* (2023.01)

(58) Field of Classification Search
CPC .............. H04B 7/15542; H04B 7/0413; H04B 7/0632; H04W 72/20
See application file for complete search history.

(56) References Cited

U.S. PATENT DOCUMENTS

| | | | | |
|---|---|---|---|---|
| 11,265,883 B1 * | 3/2022 | Parihar | | H04W 72/563 |
| 2014/0022925 A1 * | 1/2014 | Cili | | H04W 48/16 |
| | | | | 370/252 |
| 2014/0071841 A1 * | 3/2014 | Hu | | H04L 5/0073 |
| | | | | 370/252 |
| 2015/0131594 A1 * | 5/2015 | Harada | | H04W 72/541 |
| | | | | 370/329 |
| 2016/0105882 A1 * | 4/2016 | Park | | H04B 7/024 |
| | | | | 370/329 |
| 2019/0373569 A1 * | 12/2019 | Ram | | H04W 56/005 |
| 2020/0177320 A1 * | 6/2020 | Ren | | H04W 72/23 |

OTHER PUBLICATIONS

MIMO Space Time Block Coding and Alamouti Codes, Material downloaded from https://www.electronics-notes.com/articles/antennas-propagation/mimo/space-time-blockalamouti-codes-coding.php on May 18, 2021, 9 pages.

* cited by examiner

*Primary Examiner* — Mohammad S Adhami
(74) *Attorney, Agent, or Firm* — Straub & Straub; Michael P. Straub; Stephen T. Straub

(57) ABSTRACT

Methods and apparatus for using a first number of antennas at one base station, e.g., at a first CBSD, in combination with a second, e.g., lesser number of antennas at another base station to provide different wireless terminals communications channels with different channel conditions are described. A 'relay mode' of operation at the second base station facilitates communication of data from the first base station. In this way the second base station is used to relay data sent from the first base station while the UE perceives the data as having been sent over the air by the first base station. The channels from the first and second base stations operate together providing a composite channel that will have different channel conditions than would be possible using simply the antennas of the first base station. Differences in channels to different UEs facilitates transmission scheduling at the first base station.

20 Claims, 21 Drawing Sheets

| FIGURE 3A |
| FIGURE 3B |
| FIGURE 3C |

MASSIVE MIMO COMMUNICATION TECHNIQUE

FIELD

The present application relates to wireless communications, and more particularly, to methods and apparatus creating channel diversity in a MIMO (Multiple Input Multiple Output) system, e.g., a massive MIMO system.

BACKGROUND

One of the main features that 5G system has is the massive MIMO feature which involves use of a large number of antennas to transmit data to a single user. Massive MIMO is used to increase throughput and reliability of the channel in 5G systems. However, increasing the number of antennas creates a new issue sometimes referred to as the channel hardening problem.

In a normal MIMO system, where we have 2 or 4 antennas on the base station, the channel between base station antenna and the user terminal antenna experiences different channel conditions, known as fading. Because of the channel fading in the wireless channel, each user terminal, also sometimes referred to as a user device, experiences different channel conditions, when signals coming from 2 or 4 antennas are combined, the sum of the signals will still show the fading impact, and therefore different users will experience different channel conditions. The difference in channel conditions helps a packet scheduler determine different transmit user data rates to use to different user terminals, and also provides a metric the scheduler can use to rank the user terminals and determine an order in which to transit to different user terminals.

However, when the signal is transmitted from a very large number of antennas, e.g., 100 different antennas reaching to a user terminal, and the results are summed up at the user terminal, fading impact fades away. In such a case the user terminals in the network seem to have the same channel condition which causes the scheduler to view all users as having the same decision metric, or the same rank to receive the data. This is problematic since the scheduler has to schedule data to each user terminal subsequently.

In view of the above it should be appreciated that it would be advantages if methods and/or apparatus could be developed which could be used in a MIMO system, e.g., a massive MIMO system, to improve channel diversity between wireless terminals which could facilitate scheduling and/or the reliability of communication with one or more wireless terminals being served by a base station.

SUMMARY

Methods and apparatus and apparatus for using a first, e.g., large number of antennas at one base station, e.g., at a first Citizens Broadband Radio Services Device (CBSD), in combination with a second, e.g., lesser number of antennas at another base station, e.g., a second CBSD, to provide different terminals communications channels with different channel conditions are described.

In some embodiments the method uses a 'relay mode' of a second base station to facilitate communication of data from a first base station. In this way the second base station is used to relay data sent from a different base station, e.g., a first CBSD. This approach takes advantage of the fact that a different channel condition will exist between the second base station relaying the information and the wireless terminal, e.g., UE, than exists between the first base station and the UE. The channels can operate together to provide a composite channel that will have different channel conditions than would be possible using simply the antennas of the first base station to communicate to the UE. By using different base stations to act as relays for different wireless terminals different channel conditions to different wireless terminals can be, and sometimes are, achieved. The differences in channels to different UEs can change over time depending on the loading and/or other conditions at the base stations operating as relay devices.

In some embodiments the changes in channel conditions are detected and are used to facilitate scheduling by a scheduler of wireless terminals and takes into consideration channel conditions in determining the order in which transmissions to wireless terminals are to be scheduled.

In some embodiments a first base station, e.g., CBSD1, sends a 'relay mode' message to the second base station, e.g., CBSD2. The relay mode message is a command or request that controls or causes the second base station to a set of antennas at the second base station to be used in relay mode for communicating data being sent by the first base station to a UE. The set of antennas is usually a small fraction e.g., less than ⅕, the number of antennas at the second base station. The second base station will use the reserved set of antennas to communicate data, supplied by the first base station, to a UE being serviced by the first base station. The second base station will use the other antennas at the second base station for servicing UEs receiving service from the second base station.

Since the data is transmitted to the UE from the first base station as well as the second base station, e.g., as it operates in relay mode to send the data from the first base station to the UE, the channel to the UE will be in essence a composite channel resulting from the transmissions from the first base station and the second base station. The UE receives the data from the second base station and perceives it as having been sent from the first base station since it was sent using the BSS used by the first base station to communicate with the UE. The UE reports perceived channel conditions back to the first base station but not to the second base station which was operating in relay mode. The reported channel conditions will reflect the composite result of the channel to the UE from the first base station and the channel from the second base station operating in relay mode with respect to the UE.

By taking advantage of one or more additional base stations operating in relay mode a base station can obtain benefits in terms of temporal and/or spatial diversity beyond that possible if the base station was limited to using only its own antenna's to communicate with a UE. Furthermore, the channel diversity achieved by using one or more other base stations in relay mode in addition to transmitting directly to UEs being served by the base station facilitates transmission scheduling since UEs will have a greater channel diversity than if transmission were limited to coming directly from the base station doing the transmission scheduling.

An exemplary communications method, in accordance with some embodiments, comprises: sending from a first base station a relay message to a second base station; sending data from the first base station to the second base station to be transmitted to the first UE; transmitting data from the first base station to a first UE using a first set of antennas at the first base station; and receiving at the first base station, from the first UE, channel information.

Numerous variations on the described methods and apparatus are possible and while several embodiments are described in detail is should be appreciated that the full set of detailed steps need not be used in all embodiments with many of the features and determinations being useful even if not used with the other features and steps.

The detailed description which follows describes additional features, details and embodiments which can be used alone or in combination.

DETAILED DESCRIPTION

Figure 1:
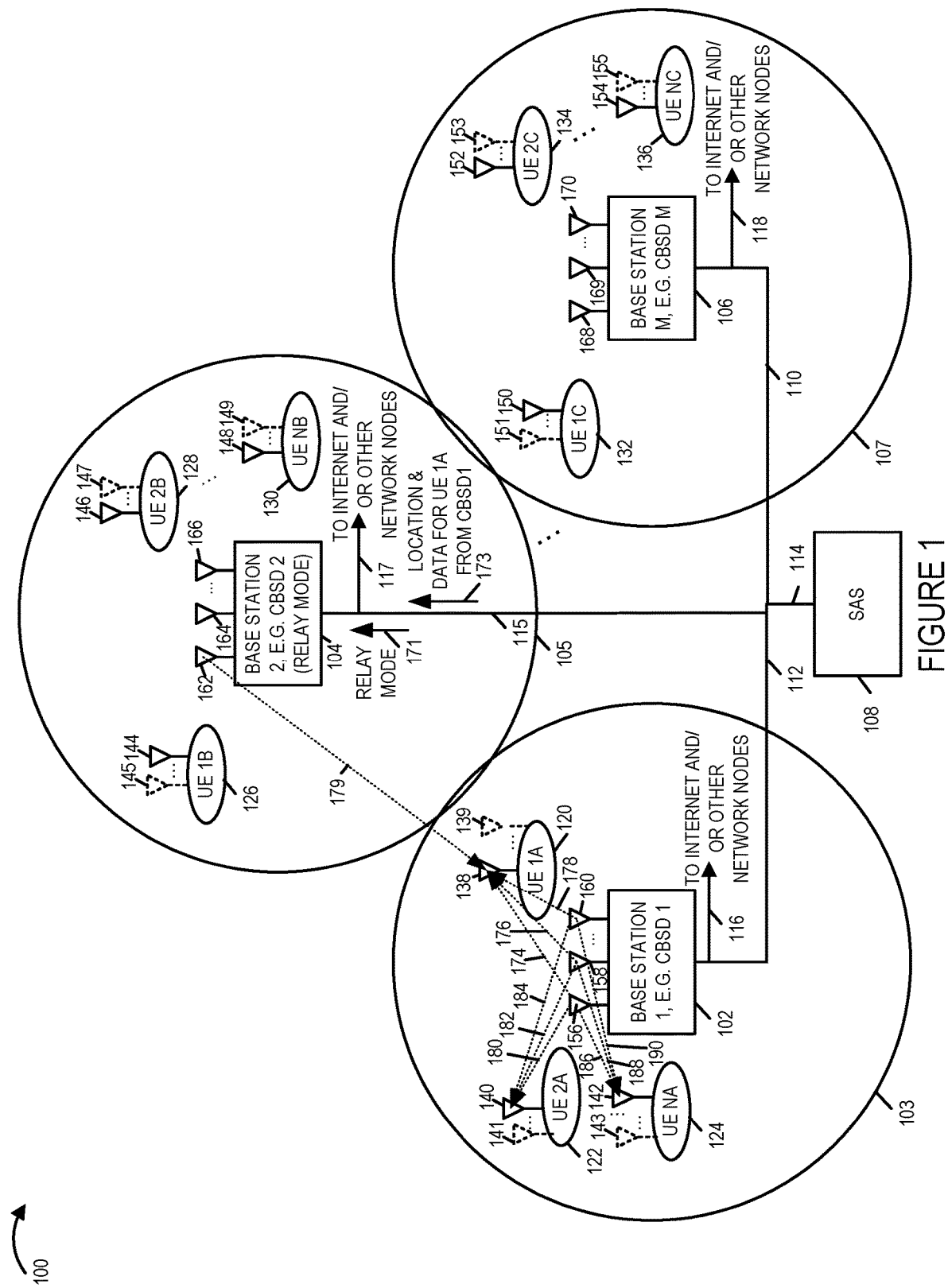
FIG. 1 is a drawing of an exemplary communications system in accordance with an exemplary embodiment.

FIG. 1 is a drawing of an exemplary communications system 100 in accordance with an exemplary embodiment. Exemplary system 100 includes a plurality of base stations (base station 1 102, e.g., CBSD 1, base station 2 104, e.g., CBSD 2, . . . , base station M 106, e.g., CBSD M) with corresponding wireless coverage areas (103, 105, . . . , 107), respectively, a spectrum access system (SAS) 108 and a plurality of wireless terminals (user equipment 1A (UE 1A) 120, UE 2A 122, . . . , UE NA 124, UE 1B 126, UE 2B 128, . . . , UE NB 130, UE 1C 132, UE 2C 134, . . . , UE NC 136). At least some of the UEs are mobile devices which may be move throughout the communications system 100 and be connected to different base stations at different times. Base station 1 102, e.g., CBSD 1, is coupled to SAS 108 via communications links 112, 114. Base station 1 102 is also coupled to the Internet and/or other network nodes via communications link 116. Base station 2 104, e.g., CBSD 2, is coupled to SAS 108 via communications links 115, 114. Base station 2 104 is also coupled to the Internet and/or other network nodes via communications link 117. Base station M 106, e.g., CBSD M, is coupled to SAS 108 via communications links 110, 114. Base station M 106 is also coupled to the Internet and/or other network nodes via communications link 118.

Base station 1 102 supports massive MIMO and includes a plurality of antennas antenna 1 156, antenna 2 158, . . . , antenna n 160. Base station 2 104 supports massive MIMO and includes a plurality of antennas antenna 1 162, antenna 2 164, . . . , antenna n 166. Base station M 106 also supports massive MIMO and includes a plurality of antennas antenna 1 168, antenna 2 169, . . . , antenna n 170. In some embodiments, N is a large number, e.g., N=64, N=128, N=100, N=200, N=256, N=512, etc. In some embodiments, some, e.g., half, of each base stations (102, 104, . . . , 106)

antennas are vertical polarization antennas and some, e.g., half, of each base stations (102, 104, . . . , 106) antennas are horizontal polarization antennas. In some embodiments, a set of antennas corresponding to a base station (102, 104, . . . , 106) form an antenna array.

Each of the UEs (UE 1A 120, UE 2A 122, . . . , UE NA 124, UE 1B 126, UE 2B 128, . . . , UE NB 130, UE 1C 132, UE 2C 134, . . . , UE NC 136) includes a first antenna (138, 140, . . . , 142, 144, 146, . . . , 148, 150, 152, . . . , 154), respectively. In some embodiments each of the UEs (UE 1A 120, UE 2A 122, . . . , UE NA 124, UE 1B 126, UE 2B 128, . . . , UE NB 130, UE 1C 132, UE 2C 134, . . . , UE NC 136) further includes a second antenna (139, 141, . . . , 143, 145, 147, . . . , 149, 151, 153, . . . , 155), respectively.

SAS 108 allocates spectrum to the base stations 102, 104, . . . , 106. For example, SAS 108 grants a block of unlicensed spectrum, for a particular duration of time, to CBSD base station 102 in response to a request from base station 1 102 for spectrum. The base station, which received the spectrum establishes a BSS, starts transmitting broadcast signals including a base station identifier. UEs in the vicinity of the base station establish a connection with the base station, send UE location information, and are scheduled by the base station, e.g., for downlink and uplink resources. For example, UE 1A 120, UE 2A 122 and UE NA 124 each establish a connection with base station 1 102. Base station 1 102, as part of massive MIMO operations, sends downlink data, via multiple antennas to each of the UEs (120, 122, . . . , 124) being served by base station 1.

Consider that base station 1 102 determines that there is insufficient channel diversity among its UEs, with regard to its scheduler. In order to increase channel diversity among its UEs, base station 1 102 selects another base station, e.g. base station 2 104, to operate as a relay with regard to data transmissions to UE1A 138. Base station 1 102 send relay mode message 171 to base station 2 104 requesting or commanding that base station 2 104 operate in relay mode for base station 1 102. Base station 2 104, in responses to the relay mode message reserves a subset of its antennas, e.g. a small subset of its antenna to be used for relay mode operations with regard to base station 1 102. In this example, the small subset includes antenna 162. Base station 1 102 sends message 173 including UE1A 120 location information and data for UE 1A to be transmitted to UE1A 120 by base station 2 104.

Base station 1 102 transmits data via antennas (156, 158, . . . , 160), wireless signals (174, 176, . . . , 178) to UE 1A 120, which are received via antenna 138. Base station 2 104, operating in relay mode, transmits wireless signals 179 conveying the received data from base station 1 102, via antenna 162 to UE 1A 120. UE 1A receives the data from both base station 1's antennas (160, 162, . . . , 164) (156, 158, . . . , 160) and base station 2 antenna 162. Base station 2 104 transmitted signals 179 using the BSS ID of base station 1 102. Thus, UE 1A 120 perceives that all the received data signals (174, 176, . . . , 178, and 179) were sent from base station 1 102, and combines the received signals to recover the communicated data. UE1A 120 generates a combined channel state information (CSI) report, which includes channel information, e.g. channel quality indicators (CQIs) corresponding to each of the antennas (156, 158, . . . , 160, and 162). The generated combined CSI report is sent to base station 1 102, which recovers the communicated quality information and generates an overall channel quality value for the UE 1A 120, which is used by the scheduler in making scheduling decisions among UEs (120, 122, . . . , 124).

Base station 1 102 transmits via antennas (156, 158, . . . , 160), wireless signals (180, 182, . . . , 184) to UE 2A 122, which are received via antenna 140. Base station 1 102 transmits via antennas (156, 158, . . . , 160), wireless signals (186, 188, . . . , 190) to UE NA 124, which are received via antenna 142. UE 2A 122 also generates and send a CSI report to base station 1, which determines an overall channel quality value for UE 2A 122. UE NA 124 also generates and send a CSI report to base station 1, which determines an overall channel quality value for UE NA 124.

The relay mode approach used with respect to UE1A 120 introduces significant spatial and time diversity regarding the UE1A 120 channel in comparison to the channels for UE 2A 122 and UE NA 124. This is advantageous with regard to base station 1 102 scheduler operation.

Figure 2A:
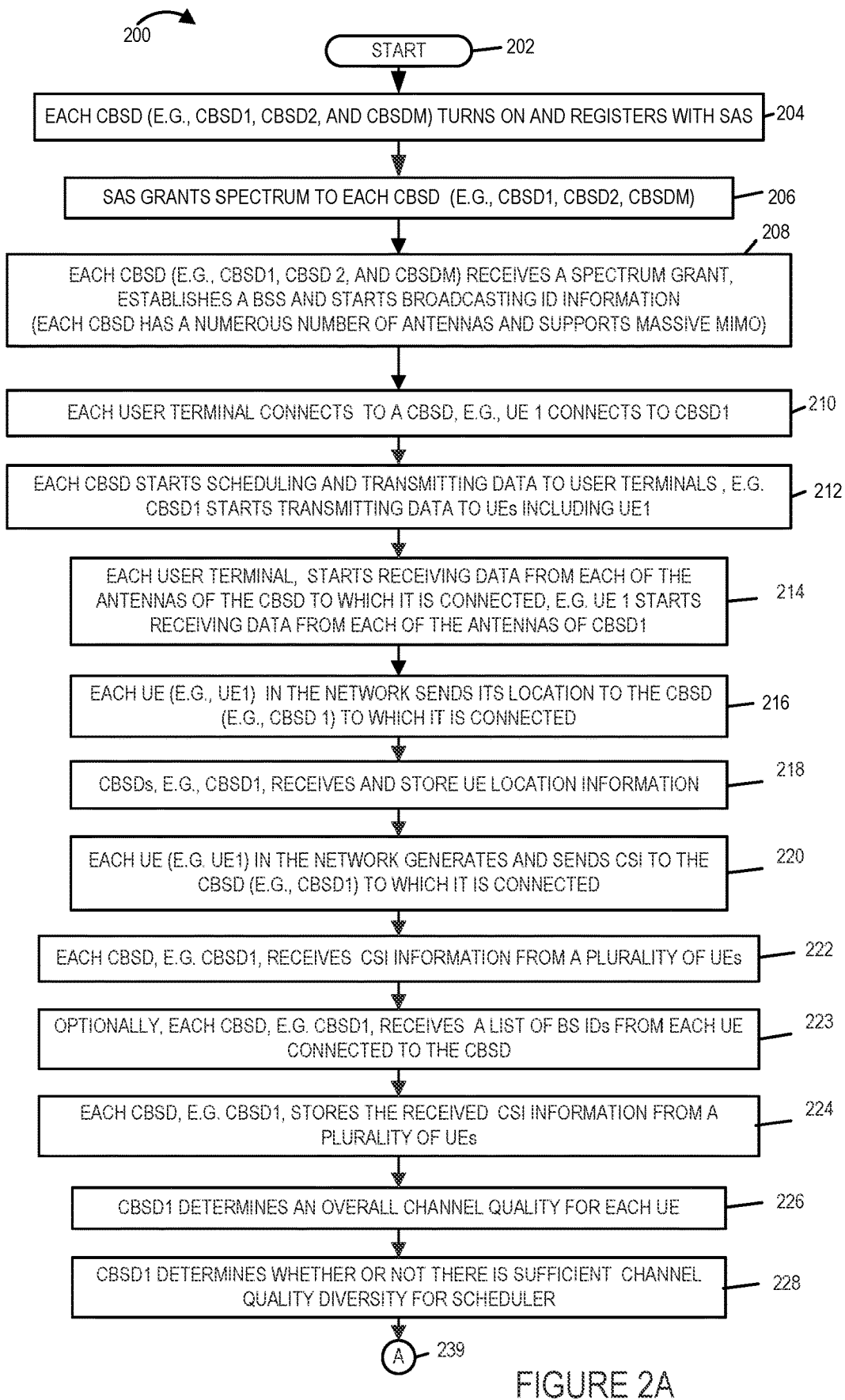
FIG. 2A is a first part of a flowchart of an exemplary method of operating a communications system in accordance with an exemplary embodiment.
Figure 2B:
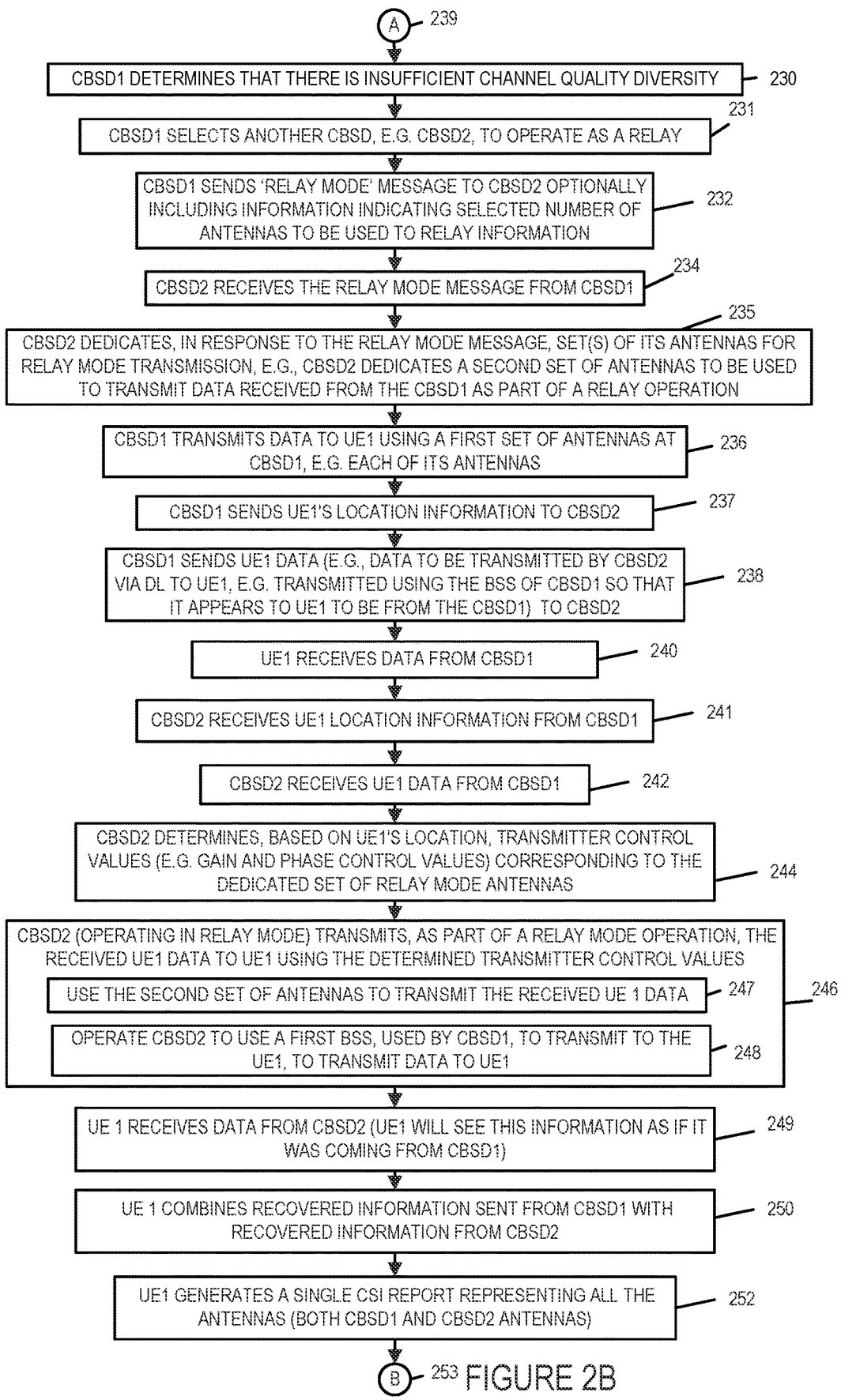
FIG. 2B is second part of a flowchart of an exemplary method of operating a communications system in accordance with an exemplary embodiment.
Figures 2, 2C:
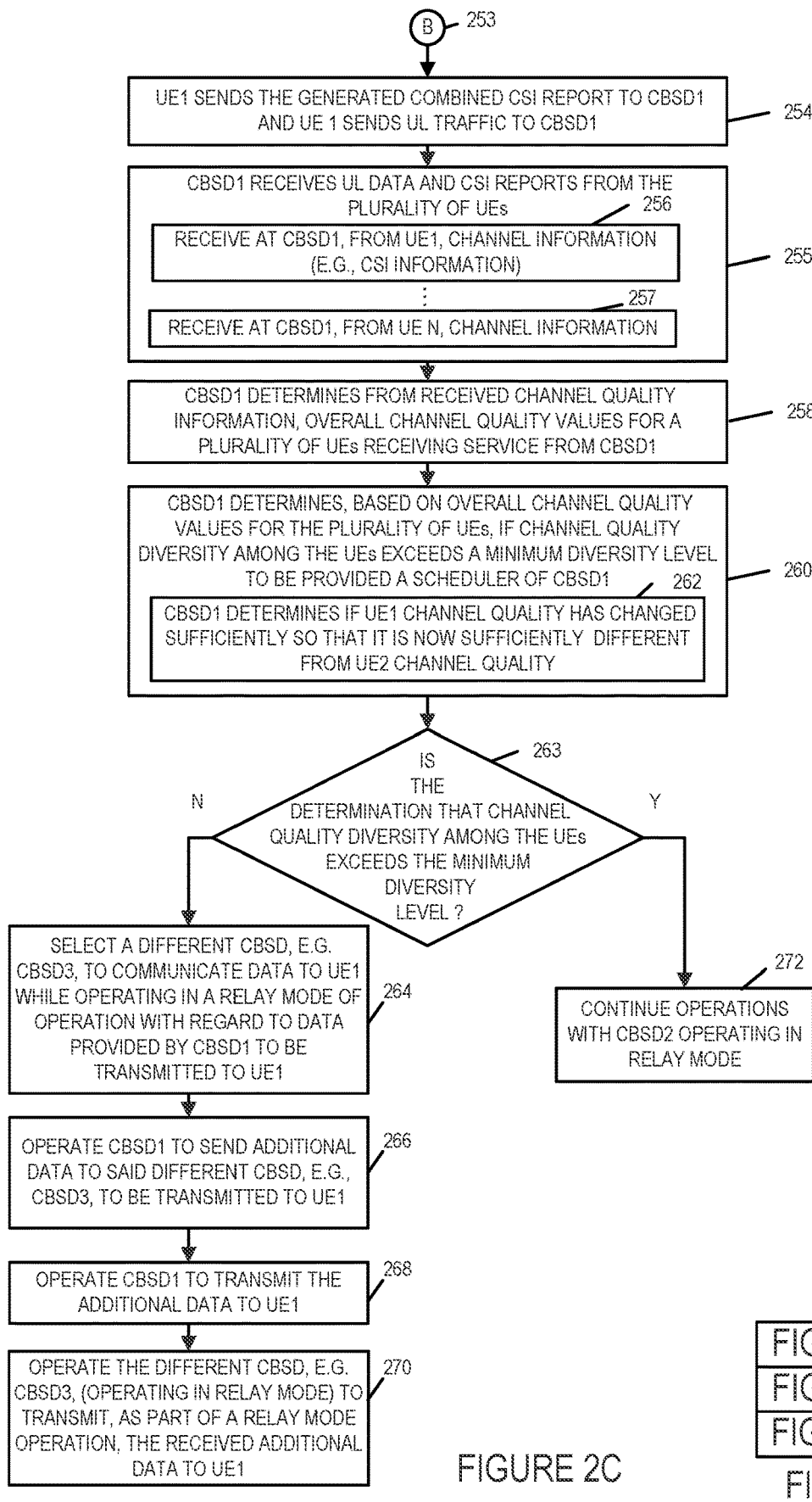
FIG. 2C is a third part of a flowchart of an exemplary method of operating a communications system in accordance with an exemplary embodiment.
FIG. 2 comprises the combination of FIG. 2A, FIG. 2B and FIG. 2C.

FIG. 2, comprising the combination of FIG. 2A, FIG. 2B, and FIG. 2C, is a flowchart 200 of an exemplary method of operating a communications system, e.g., communications system 100 of FIG. 1, in accordance with an exemplary embodiment. Operation of the exemplary method starts in step 202, e.g., in which various system elements including a spectrum access system (SAS), e.g., SAS 108, is powered on and initialized. Operation proceeds from start step 202 to step 204.

In step 204 each of the CBSD base stations (e.g., CBSD 1 102, CBSD 2 104, . . . , CBSD M 106) turns on and registers with the SAS. Operation proceeds from step 104 to step 206.

In step 206 the SAS grants spectrum to each CBSD. Operation proceeds from step 206 to step 208. In step 208 each CBSD (e.g., CBSD 1 102, CBSD 2 104, . . . , CBSD M 106) receives a spectrum grant from the SAS, establishers as basic service set (BSS) and starts broadcast ID information, e.g. a BSSID. Each of the CBSDs (e.g., CBSD 1 102, CBSD 2 104, . . . , CBSD M 106) has a numerous number of antennas, e.g., 100 or more antennas, and supports massive MIMO. Operation proceeds from step 208 to step 210.

In step 210 each user terminal, e.g. UE 1 (e.g., UE1A 120), connects to a CBSD, e.g., CBSD1. For example, UEs (UE1A 120, UE2A 122, . . . , UENA 124), connect to CBSD 1 102; UEs (UE1B 126, UE2B 128, . . . , UENB 130), connect to CBSD 2 104; and (UE1C 132, UE2C 134, . . . , UENA 136), connect to CBSD M 106. Operation proceeds from step 210 to step 212.

In step 212 each CBSD starts scheduling and transmitting data to connected user terminals, e.g. CBSD 1 starts transmitting data to UEs including UE1. Operation proceeds from step 212 to step 214.

In step 214, each user terminal starts receiving data from each of the antennas of the CBSD to which it is connected, e.g., UE 1 starts receiving data from each of the antennas of CBSD1. Operation proceeds from step 214 to step 216.

In step 216 each UE, e.g., UE 1, in the network sends its location to the CBSD, e.g., CBSD1, to which it is connected. Operation proceeds from step 216 to step 218.

In step 218 CBSDs, e.g., CBSD1, receives and stores UE location information. Operation proceeds from step 218 to step 220.

In step 220 each UE, e.g., UE 1, in the network generates and sends channel status information (CSI) to the CBSD, e.g., CBSD1, to which it is connected. Operation proceeds from step 220 to step 222.

In step 222 each CBSD, e.g., CBSD1, receives CSI information from a plurality of UEs. For example, CBSD1 102 receives channel status information (CSI) reports from UEs (UE1 (which is UE1A 120), UE 2A 122, . . . , UENA 124). Operation proceeds from step 222 to step 224.

In step 224, each CBSD, e.g., CBSD1, stores the received CSI from a plurality of UEs. In some embodiments, a CSI report from a UE includes channel quality information, e.g., a set of channel quality indicator (CQI) values, each CQI value corresponding to a different CBSD antenna from which the UE has received data. Operation proceeds from step 224 to step 226.

In step 226 CBSD1 determines an overall channel quality for each UE which are being served. For example, CBSD 1 102 determines an overall channel quality for UEs (UE 1A 120, UE2A 122, . . . , UENA 124). Operation proceeds from step 226 to step 228.

In step 228 CBSD1 determines whether or not there is sufficient channel quality diversity for the scheduler, e.g., does the channel quality diversity among the UEs exceed a minimum diversity level to be provider the scheduler of CBSD1. Operation proceeds from step 228 to step 230 via connecting Node A 239.

In step 230 CBSD1 determines that there is insufficient channel quality diversity. Operation proceeds from step 230 to step 231.

In step 231, CBSD1 selects another CBSD, e.g., CBSD2 104, to operate as a relay. In some embodiments, said CBSD1 and CBSD2 (and CBSD3) are CBSDs with physically adjacent coverage areas; and UE1 (e.g., UE1A 120) is in an edge area between the CBSD1 and CBSD2 (e.g., CBSD1 selects as a relay CBSD a CBSD, that UE1 indicated it was able to receive signals from, e.g., BSIDs, e.g., as indicated by a list of BSIDs that UE1 reported to the first base station in optional step 223 or based on a list of CBSDs determined from the location of UE1 and with the CBSD1 selecting, in step 231, from the list of CBSDs which CBSD should be used as a relay to UE1).

Operation proceeds from step 231 to step 232.

In step 232, CBSD1 sends a 'relay mode' message to CBSD2, optionally including information indicating a selected number of antennas to be used to relay information. In some embodiments, the 'relay mode' message is a request message, requesting CBSD2 to operate in relay mode. In other embodiments, the relay mode message is a command message, commanding CBSD to operate in relay mode. In some embodiments, the relay mode message is message requesting or commanding CBSD2 to reserve a set of antennas for relaying data provided by the CBSD1. Operation proceeds from step 232 to step 234.

In step 234 CBSD2 receives the relay mode message from CBSD1. Operation proceeds from step 234 to step 235. In step 235, CBSD2 dedicates, in response to the relay mode message, one or more sets of its antennas for relay mode transmission, e.g. CBSD2 dedicates a second set of antennas to be used to transmit data from the CBSD1 as part of a relay operation. Operation proceeds from step 235 to step 236.

In step 236 CBSD1 transmits data to UE 1 using a first set of antennas at CBSD1. In embodiments, the first set of antennas includes each of CBSD1's antennas. In some embodiments, the first set of antennas includes all or the majority of transmitter antennas at CBSD1. Operation proceeds from step 236 to step 237.

In step 237 CBSD1 send UE1's (e.g., UE1A's 120) location to CBSD2. Operation proceeds from step 237 to step 238. In step 238 CBSD1 sends UE1 data (e.g., data to be transmitted by CBSD2 via downlink (DL) to UE using the BSS of CBSD1 so that it appears to UE1 (e.g., UE1A 120) to be coming from CBSD1) to CBSD2. Operation proceeds from step 238 to step 240.

In step 240 UE1 receives data from CBSD1. Operation proceeds from step 240 to step 241. In step 241 CBSD2 receives UE1 location information from CBSD1. Operation proceeds from step 241 to step 242. In step 242 CBSD2 receives UE1 data from CBSD1. Operation proceeds from step 242 to step 244.

In step 244 CBSD2 determines, based on UE1's location transmitter control values (e.g., gain and phase control values) corresponding to the dedicated set of relay mode antennas. Operation proceeds from step 244 to step 246. In step 246, CBSD2, operating in relay mode, transmits, as part of a relay mode operation, the received UE1 data to UE 1 using the determined transmitter control values. Step 246 includes steps 247 and 248. In step 247 CBSD2 uses the second set of antennas to transmit the received UE1 data to UE1. In some embodiments, the second set of antennas includes less antennas than the first set of antennas and includes at most a fraction of transmitter antennas available at CBSD2. In some embodiments, the first set of antennas includes at least ¾ of the transmitter antennas at CBSD1 and the second set of antennas includes ¼ or less of the transmitter antennas at CBSD2, the second set of antennas being reserved for use in relaying data from CBSD1. In step 248 CBSD2 uses a first BSS, used by CBSD1 to transmit data to UE1, to transmit to UE1 data to UE1. In some embodiments, the first BSS is different from a second BSS used by CBSD2 to transmit to UEs to which CBSD2 provides service.

In some embodiments, CBSD1 and CBSD2 are spaced apart from one another, said transmission (step 246) of the data from CBSD2 to UE1 in addition to the transmission (step 236) of the data from CBSD1 to UE1 providing communications channel spatial diversity. In some such embodiments, the step of transmitting (246) from the CBSD2, as part of a relay mode operation, the received data to UE1 is performed at a time that is different from the time at which said data is transmitted (step 236) from CBSD1, thereby providing temporal channel diversity in addition to spatial channel diversity. In some embodiments, the time between the transmission of the data to the UE1 from CBSD1 and CBSD2 is less than the time interval used by the CBSD1 to schedule sets of UEs for data transmission, with data transmission in a scheduled set of UEs to be performed in a sequential manner. Operation proceeds from step 246 to step 249.

In step 249 UE1 receives data from CBSD2. UE1 will see this information as if it was coming from CBSD1. Operation proceeds from step 249 to step 250.

In step 250 UE1 combines recovered information sent from CBSD1 (data received in step 242) with recovered information from CBSD2 (data received in step 249). Operation proceeds from step 250 to step 252. In step 252 UE1 generates a single CSI report representing all the antennas (both the first set of CBSD1 antennas and the second set of CBSD2 antennas). In some embodiments, the single channel state information (CSI) report includes a set of channel quality indicator (CQI) values, each individual CQI value in the set corresponding to a different CBSD antenna. Operation proceeds from step 252, via connecting node B 253, to step 254.

In step 254 UE1 sends the generated combined CSI report to CBSD1 and UE1 sends uplink (UL) traffic to CBSD1. Operation proceeds from step 254 to step 255.

In step 255 CBSD1 receives UL data and CSI reports from the plurality of UEs connected to CBSD1. Step 255 includes step 256 and step 257. In step 256 CBSD1 receives from UE1 channel information, e.g., CSI information, e.g., a CSI report including a set of CQI values. The channel information received from UE1 is based on the transmission of the data to UE1 from CBSD1 and the transmission of the data to UE1 from CBSD2. In step 257 CBSD1 receives from UE N, channel information. Operation proceeds from step 255 to step 258.

In step 258 CBSD1 determines from received channel quality information, overall channel quality values for the plurality of UEs receiving service from CBSD1, e.g. a first channel quality value corresponding to UE1 (UE1A 120), a second channel quality value corresponding to UE2A 122, . . . , an N the channel quality value corresponding to UE NA 124. In some embodiments, an individual channel quality value for a UE is the average reported channel quality value corresponding to the set of antennas from which the UE received the same data. Operation proceeds from step 258 to step 260.

In step 260 CBSD1 determines, based on overall channel quality values for the plurality of UEs, if channel quality diversity among the UEs exceeds a minimum diversity level to be provided a scheduler of CBSD1, e.g., channel diversity as indicated by the size of range of overall channel quality values being over a predetermined minimum level used to support scheduling. Step 260 includes step 262, in which CBSD1 determines if UE1 channel quality has changed sufficiently so that it is now sufficiently different from UE2 channel quality. Operation proceeds from step 260 to step 263.

In step 263 if the determination of step 260 is that the channel quality diversity among the UEs being serviced by CBSD1 exceeds the minimum diversity level to be provided to the scheduler of CBSD1, then operation proceeds from step 263 to step 272, in which operations continue with CBSD2 continuing to operate in relay mode, e.g., receiving data for UE1 from CBSD1 and transmitting the received data to UE via the second set of antennas. However, in step 263 if the determination of step 260 is that the channel quality diversity among the UEs being serviced by CBSD1 does not exceeds the minimum diversity level to be provided to the scheduler of CBSD1, then operation proceeds from step 263 to step 264, in which CBSD1 selects a different CBSD, e.g. CBSD3 (e.g., CBSD M 106), to communicate data to UE1 while operating in a relay mode of operation with regard to data provided by CBSD1 to be transmitted to UE1. Operation proceeds from step 264 to step 266.

In step 266 CBSD1 sends additional data to said different CBSD, e.g., CBSD3, to be transmitted to UE1, e.g., while CBSD3 is operating in relay mode with regard to the transmission of the additional data. Operation proceeds from step 266 to step 268. In step 268 CBSD1 is operated to transmit the additional data to UE1, e.g., using the first set of antennas. Operation proceeds from step 268 to step 270.

In step 270 the different CBSD, e.g., CBSD3, (operating in relay mode) transmits, as part of a relay mode operation, the received additional data to UE1, e.g., using a third set of antennas. In various embodiments, the third set of antennas is the same size as the second set of antennas.

Figure 3A:
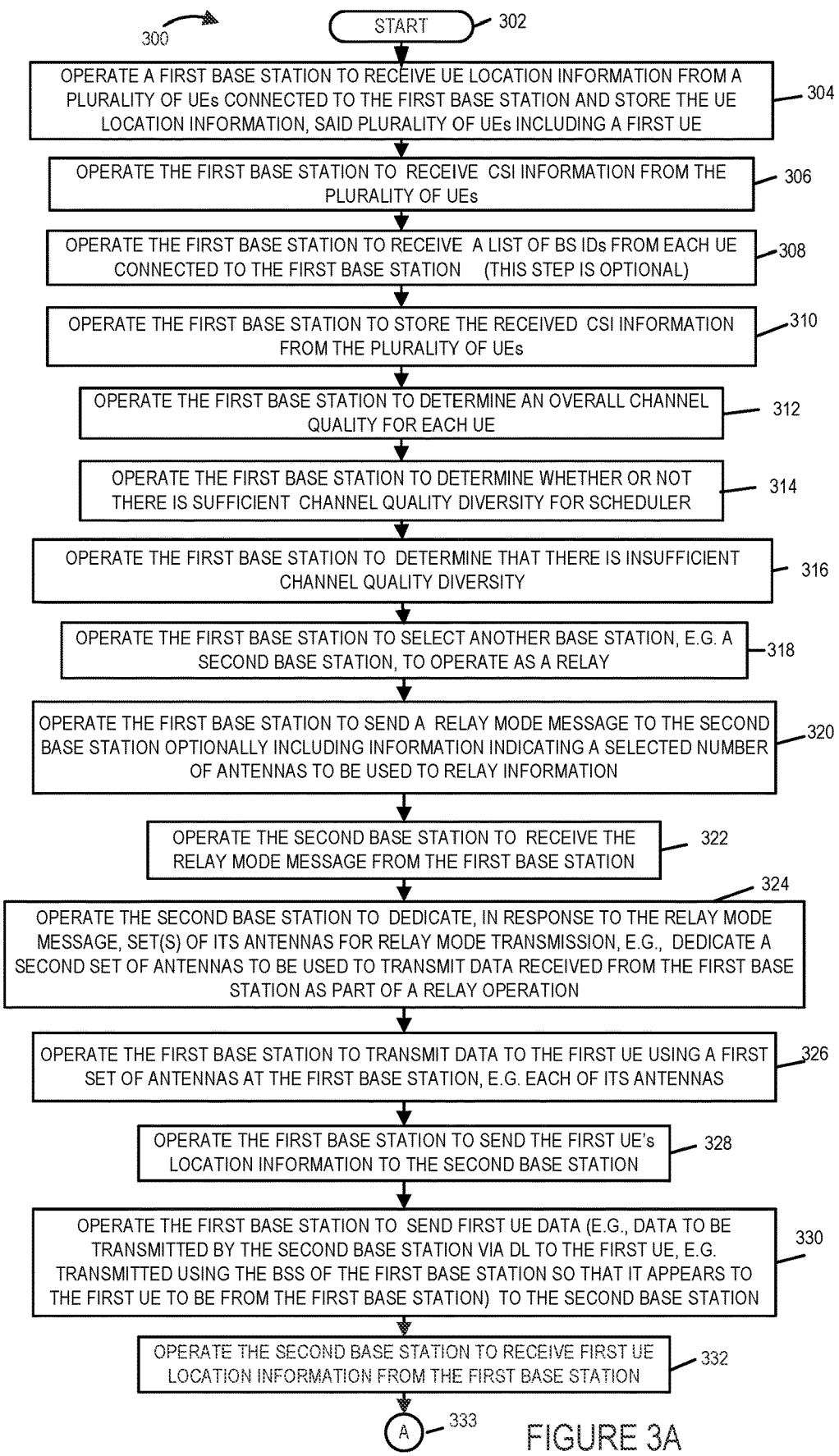
FIG. 3A is a first part of a flowchart of an exemplary method of operating a group of base stations, e.g., CBSDs, in accordance with an exemplary embodiment.
Figure 3B:
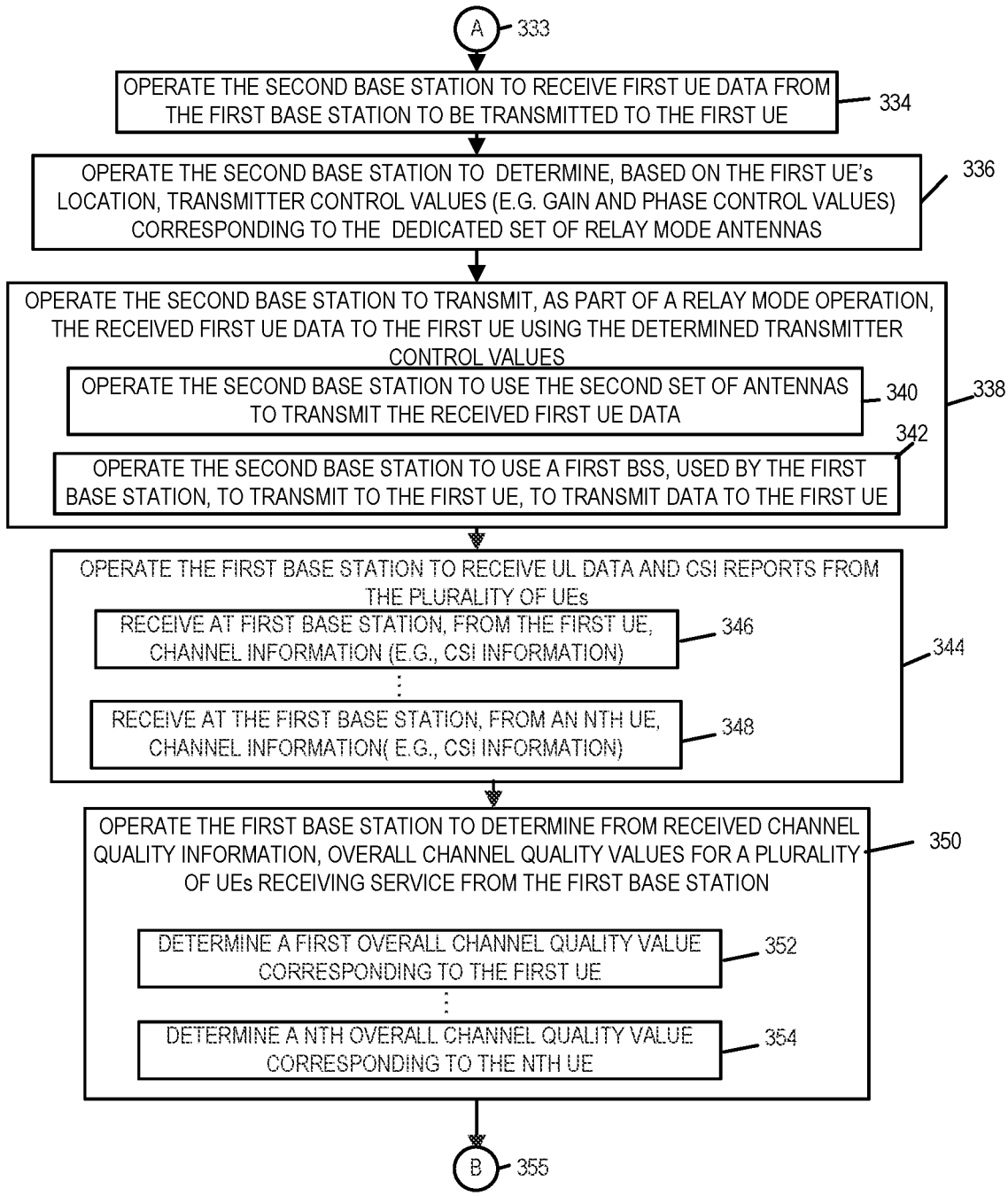
FIG. 3B is a second part of a flowchart of an exemplary method of operating a group of base stations, e.g., CBSDs, in accordance with an exemplary embodiment.
Figures 3, 3C:
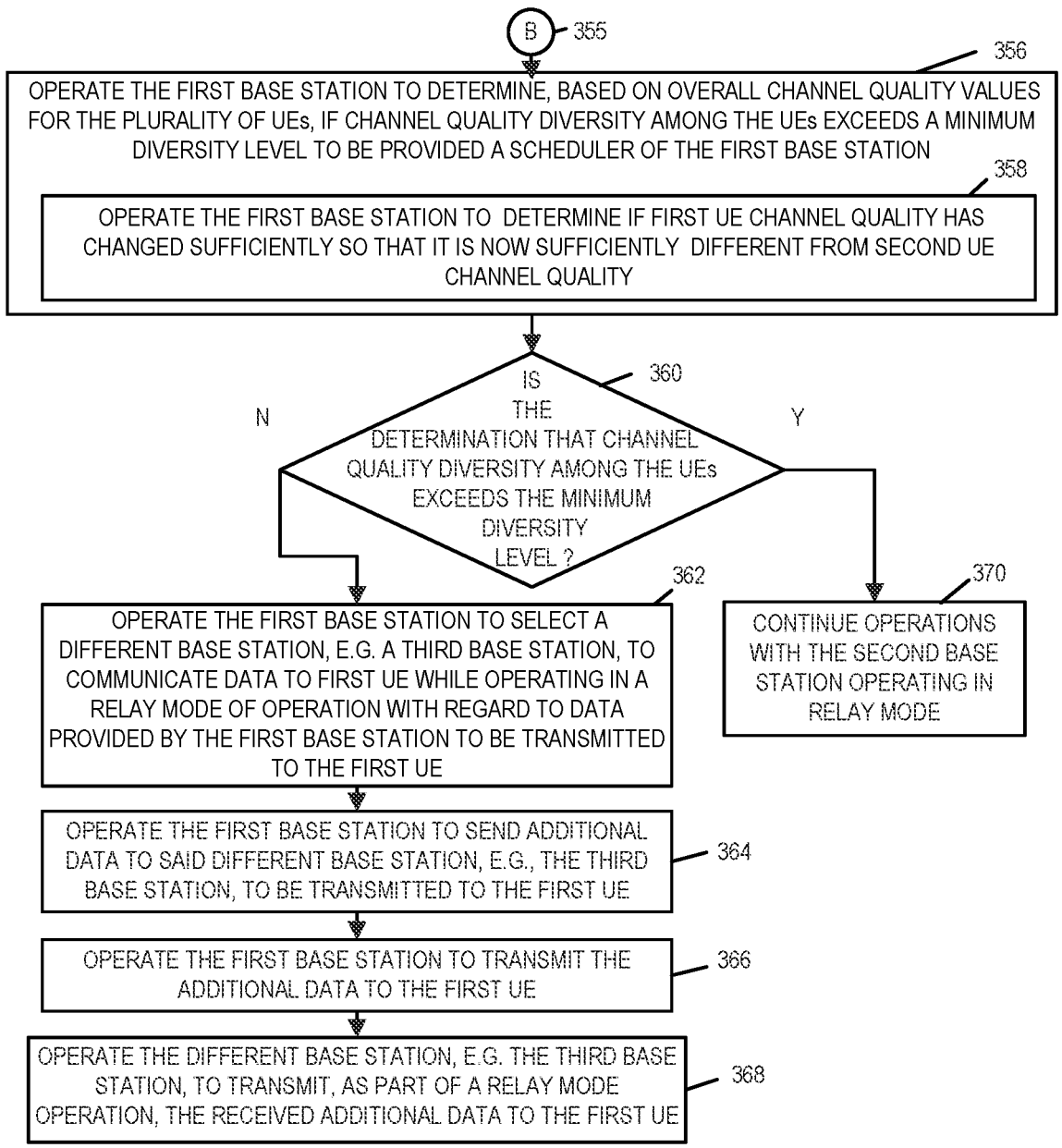
FIG. 3C is a third part of a flowchart of an exemplary method of operating a group of base stations, e.g., CBSDs, in accordance with an exemplary embodiment.
FIG. 3 comprises the combination of FIG. 3A, FIG. 3B and FIG. 3C.

FIG. 3, comprising the combination of FIG. 3A and FIG. 3B, is a flowchart 300 of an exemplary method of operating a group of base stations, e.g., CBSDs, in accordance with an exemplary embodiment. The group of base stations includes, e.g., a first base station, e.g., base station 102 of system 100 of FIG. 1, a second base station, e.g., base station 2 104 of system 100 of FIG. 1, and a third base station, e.g., base station 106 of system 100 of FIG. 1. Operation of the exemplary method of flowchart 300 starts in step 302 in which the group of base stations is powered on and initialized and user equipment (UE) devices establish connections to the base stations. Operation proceeds from start step 302 to step 304.

In step 304 the first base station receives UE location from a plurality of UEs connected to the first base station, said UEs connected to the first base station including a first UE (e.g., UE1A 120 of FIG. 1), and the first base station stores the received UE location information. Operation proceeds from step 304 to step 306.

In step 306 the first base station receives channel state information (CSI), e.g., CSI reports including channel quality indicator (CQI) values, from the plurality of UEs connected to the first base station. Operation proceeds from step 306 to step 308.

In step 308 the first base station receives a list of base stations identifies from each UE connected to the first base station, said list of base station identifiers including identifiers identifying the base station which are within communications range of the UE and which have been detected by the UE. In step 308 the first base station receives a list of base stations from the first UE, said list including identifiers for the first base station, the second base station and the third base station. In some embodiments, the received list further includes received power level information corresponding to each detected base station. Operation proceeds from step 308 to step 310.

In step 310 the first base station stores the received CSI information received from the plurality of UEs. In step 310 the first base station further stores the received list of base station identifiers. Operation proceeds from step 310 to 312.

In step 312 the first base station determines an overall channel quality for each UE from which it has received a CSI report. In some embodiments, determining an overall channel quality for an individual UE includes determining overall channel quality based on the channel quality reported for each of a set of first base station antennas, e.g., averaging channel quality indicator (CQI) values corresponding to individual antennas to obtain an overall channel quality value for the UE. As part of step 312 the first base station determines an overall channel quality for at least a first UE and a second UE. Operation proceeds from step 312 to step 314.

In step 314 the first base station determines whether or not there is sufficient channel quality diversity for the scheduler of the first base station, e.g., does the channel quality diversity among the UEs meet or exceed a minimum channel quality diversity threshold of the scheduler. Operation proceeds from step 314 to step 316.

In step 316 the first base station determines that there is insufficient channel quality diversity. Operation proceeds from step 316 to step 318.

In step 318 the first base station selects to use another base station, e.g., the second base station, to operate as a relay. In some embodiments, said first and second base station (and the third base station) are base stations with physically adjacent coverage areas; and the first UE is a UE in an edge area between the first and second base stations (e.g., the first base station selects as a relay base station a base station the first UE indicated it was able to receive signals from, e.g., base station identifiers (BSIDs), e.g., as indicated by a list of BSIDs that the first UE reported to the first base station in optional step 308 or based on a list of base stations determined from the location of the first UE and with the first base station selecting, in step 318, from the list of base stations (BSs) which BS should be used as a relay to the first UE).

Operation proceeds from step 318 to step 320.

In step 320 the first base station sends a relay mode message to second base station optionally including information indicating a selected number of antennas to be used to relay information. In some embodiments the relay mode message is a message requesting or commanding the second base station to operate in relay mode. In some embodiments, the relay mode message is a message requesting or commanding the second base station to reserve a set of antennas for relaying data provided by the first base station. Operation proceeds from step 320 to step 322.

In step 322 the second base station receives the relay mode message from the first base station. Operation proceeds from step 322 to step 324. In step 324 the second base station dedicates, in response to the relay mode message, one or more sets of its antennas for relay mode transmission. For example, the second base station dedicates a second set of antennas to be used to transmit data received from the first base station as part of a relay mode operation. Operation proceeds from step 324 to step 326.

In step 326 the first base station transmits data to the first UE using a first set of antennas at the first base station, e.g., each of the first base stations antennas. In some embodiments, the first set of antennas includes all or the majority of transmitter antennas at the first base station. Operation proceeds from step 326 to step 328.

In step 328 the first station sends the first UE's location information to the second base station. Operation proceeds from step 328 to step 330.

In step 330 the first base station sends first UE data (e.g., data to be transmitted by the second base station via downlink to the first UE, e.g., transmitted using the BSS of the first base station so that it appears to the first UE that the data is being received from the first base station) to the second base station. Operation proceeds from step 330 to step 332.

In step 332 the second base station receives the first UE location information from the first base station. Operation proceeds from step 332 via connecting node A 333 to step 334. In step 334, the second base station receives first UE data from the first base station. Operation proceeds from 334 to step 336. In step 336 the second base station determines, based on the first UE's location, transmitter control values (e.g., gain and phase control values) corresponding to the dedicated set of relay mode antennas. Operation proceeds from step 336 to step 338. In step 338 the second base station, transmits, as part of a relay mode operation, the received first UE data to the first UE using the determined transmitter control values. Step 338 includes steps 340 and 342. In step 340 the second base station uses the second set of antennas to transmit the received data to the first UE. In some embodiments, the second set of antennas includes less antennas than the first set of antennas and includes at most a fraction of transmitter antennas available at the second base station. In some embodiments, the first set of antennas includes at least ¾ of the transmitter antennas at the first base station and the second set of antennas includes ¼ or less of the transmitter antennas at the second base station, the second set of antennas being reserved for use in relaying data from the first base station. In step 342 the second base station uses a first BSS used by the first base station, to transmit to the first UE, to transmit data to the first UE. In some such embodiments, the first BSS is different from a second BSS used by said second base station to transmit to UEs to which the second base station provides service.

In some embodiments, the first and second base stations are spaced apart from one another, said transmission (step 338) of the data from the second base station to the first UE in addition to the transmission (step 326) of the data from the first base station to the first UE providing communications channel spatial diversity. In some such embodiments, the step of transmitting (step 338) from the second base station, as part of a relay mode operation, the received data to the first UE is performed at a time that is different from the time at which said data is transmitted (step 326) from the first base station, thereby providing temporal channel diversity in addition to spatial channel diversity. In some embodiments, the time between the transmission of the data to the first UE from the first base station and the second base station is less than the time interval used by the first base station to schedule sets of UEs for data transmission with data transmission in a scheduled set of UEs to be performed in a sequential manner. Operation proceeds from step 338 to step 344.

In step 344 the first base station receives uplink (UL) data and channel state information (CSI) reports from the plurality of UEs being serviced by the first base station. Step 344 includes steps 346 and 348. In step 346 the first base station receives from the first UE channel information, e.g. a channel state information (CSI) report including a plurality of sets of channel state information, e.g. quality indicator (CQI) values and/or other channel state information values, each set of CSI including a CQI value and/or other channel state information values, corresponding to a different base station antenna from which the first UE received data, the different base station antennas include base station antennas from both the first base station and from the second base station (e.g., the first set of antennas and the second set of antennas). Thus, the received CSI report from the first UE is a combined CSI report corresponding to a large set of first base station antennas and a small set of second base station antennas. The first UE channel information is based on the transmission of the data to the first UE from the first base station and the transmission of the data to the first UE from the second base station. In step 348 the first base station receives from the Nth UE channel information, e.g. a CSI report including a plurality of sets of channel state information, e.g., channel quality indicator (CQI) values and/or other channel state information values, each set of CSI including a CQI value and/or other channel state information values, corresponding to a different base station antenna from which the Nth UE received data. The Nth UE channel information is based on the transmission of the data to the Nth UE from the first base station and the transmission of the data to the Nth UE from the second base station. Operation proceeds from step 344 to step 350.

In step 350 the first base station determines from the received channel quality information, overall channel quality values for a plurality of UEs receiving service from the first base station. Step 350 includes step 352 and step 354. In step 352 the first base station determines a first overall channel quality value corresponding to the first UE, e.g., based on the received CQI values received from the first UE in the CSI report, e.g., an average CQI value is determined. In step 354 the first base station determines an Nth overall channel quality value corresponding to the Nth UE, e.g., based on the received CQI values received from the Nth UE in the CSI report, e.g. an average CQI value is determined. Operation proceeds from step 350, via connecting node B 355 to step 356.

In step 356 the first base station determines, based on overall channel quality values for the plurality of UEs, if channel quality diversity among the UEs exceeds a minimum diversity level to be provided a scheduler of the first base station, e.g., channel diversity as indicated by the size of the range of overall channel quality values being over a predetermined minimum level used to support scheduling. In some embodiments, step 356 includes step 358, in which the first base station determines if the first UE channel quality has changed sufficiently so that it is now sufficiently different from the second UE channel quality. Operation proceeds from step 356 to step 360.

In step 360 if the determination is that the channel quality diversity among the UEs exceeds the minimum diversity level, then operation proceeds from step 360 to step 370, in which operations continue with second base station operating in relay mode on behalf of the first base station. However, if the determination is that channel diversity among the UEs does not exceed the minimum diversity level, then operation proceeds from step 360 to step 362.

In step 362 the first base station selects a different base station, e.g. the third base station, to communicate data to the first UE while operating in a relay mode of operation with regard to data provided by the first base station to be transmitted to the first UE. Operation proceeds from step 362 to step 364.

In step 364 the first base station sends addition data to said different base station, e.g., the third base station, to be transmitted to the first UE, e.g. while operating in relay mode with regard to the transmission of data. Operation proceeds from step 364 to step 366. In step 366, the first base station transmits the additional data to the first UE. Operation proceeds from step 366 to step 368. In step 368 the different base station, e.g., the third base station transmits, as part of a relay mode operation, the received additional data to the first UE, e.g., using a third set of antennas dedicated for relay mode operation and using the BSS ID of the first base station.

Figure 4:
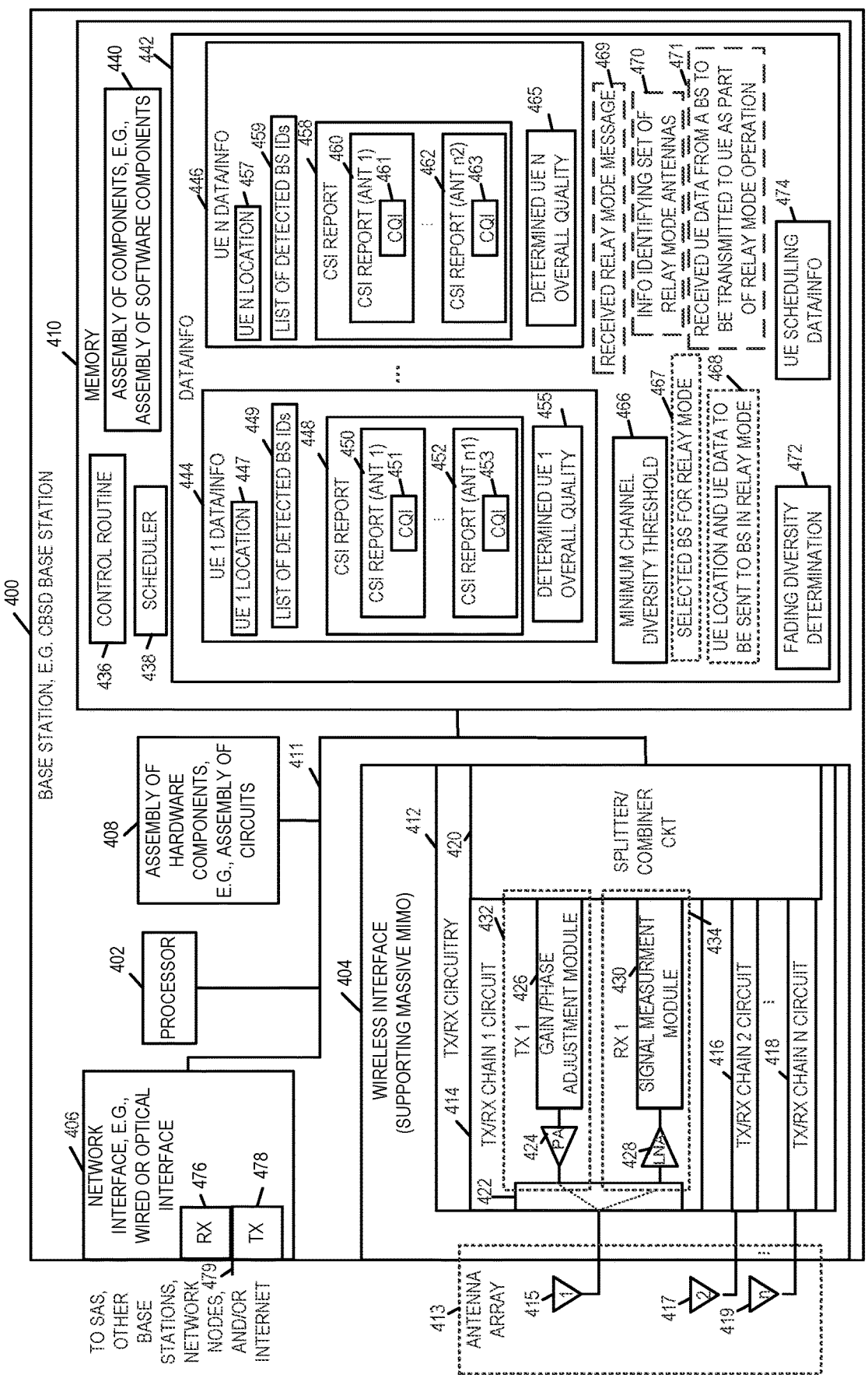
FIG. 4 is a drawing of an exemplary base station, e.g. a Citizens Broadband Radio Services Device (CBSD) base station, in accordance with an exemplary embodiment.

FIG. 4 is a drawing of an exemplary base station 400, e.g., a Citizens Broadband Radio Services Device (CBSD), in accordance with an exemplary embodiment. Exemplary base station 400 is, e.g., one of the base stations (base station 1 102, . . . , base station 2 104, base station M 106) of FIG. 1, CBSD 700 of FIGS. 6-11, CBSD 2 750 of FIG. 9-11, CBSD M 751 of FIG. 11, CBSD1 1302 of FIGS. 13-15, CBSD 1304 of FIGS. 13-15, a base station implementing steps of FIG. 12, a base station implementing steps of the method of flowchart 200 of FIG. 2 and/or a base station implementing the steps of the method of flowchart 300 of FIG. 3.

Base station 400 includes a processor 402, e.g., a CPU, a wireless interface 404, a network interface 406, an assembly of hardware components 408, e.g., an assembly of circuits, memory 410 and a bus 411 via which the various elements are coupled together. Network interface 406, e.g., a wired or optical interface includes a receiver (RX) 476 and a transmitter 478. Network interface 406 couples the base station 400, via its network interface connector 479 and one or more communications links, e.g., backhaul links, to a spectrum access system (SAS), other base stations, network nodes, e.g., core network nodes, routers, etc., and/or the Internet.

Wireless interface 404, which supports massive MIMO, includes TX/RX circuitry 412 and a plurality of antennas (antenna 1 415, antenna 2 417, . . . , antenna n 419) coupled together. TX/RX circuitry 412 includes a plurality of TX/RX chains (TX/RX chain 1 circuit 414, TX/RX chain 2 circuit 416, . . . , TS/RX chain N circuit 418), which are coupled to splitter/combiner circuit 420. TX/RX chain 1 circuit 414 includes a TX/RX switching circuit 422, wireless transmitter (TX) 1 432 and wireless receiver (RX) 1 434. TX 1 432 includes a gain/phase adjustment module 426 coupled to power amplifier (PA) 424. RX 1 434 includes a low noise amplifier (LNA) 428 coupled to signal measurement module 430. In some embodiments the antennas (antenna 1 415, antenna 2 417, . . . , antenna n 419) are part of an antenna array 413. In some embodiments, the set of antennas (antenna 1 415, antenna 2 417, . . . , antenna n 419) includes both vertical polarization antennas and horizontal polarization antennas. The additional TX/RX chains (TX/RX chain 2 circuit 416, . . . , TX/RX chain N circuit 418) included in TX/RX circuitry 412 include similar components as the components shown with respect to TX/RX chain 1 414. Received signals received by wireless interface 404 includes signals from wireless terminals, e.g., signals communicating channel state information reports, sounding reference signals, uplink data signals. Transmitted signals transmitted by wireless interface 404 include base station ID signals, reference signals, downlink control signals and downlink traffic signals. Gain phase adjustment module 426 receives and uses transmitter control values, e.g., gain and/or phase control values associated with an amplifier used to amplify a signal to be transmitted. The transmitter control value(s) are, in some embodiments, are set based UE location and/or on a determined SRS (from a received SRS corresponding to the antenna of the chain). Signal measurement module measures received SRS signals, e.g., obtaining measurement information used to determine an SRS value.

Memory 410 includes a control routine 436, a scheduler 438, and an assembly of components 440, e.g., an assembly of software components, and data/information 442. The control routine 436 includes, e.g., code which when executed by processor 402, causes the base station 400 to perform various base station operations, e.g., memory load, memory read, activate and control the interfaces (404, 406) to perform receive and transmit operations in accordance with a frequency/timing structure and/or implemented communications protocols. Scheduler 438 schedules wireless terminals, e.g., assigns DL and UL air link resources to UEs based on UE needs, reported and/or determined channel conditions, received SRS signals, and/or measured fading diversity. The scheduling performed by scheduler 438 may, and sometimes does favor different wireless devices at different times.

Assembly of components 440, e.g., an assembly of software components, includes, e.g., routines, subroutines, application, etc., including code which when executed by a processor, e.g., processor 402, causes the base station 400 to implement steps of an exemplary method, e.g., steps of the method of flowchart 200 of FIG. 2 and/or steps of the method of flowchart 300 of FIG. 3.

Data/information 442 includes data/information corresponding to a plurality of UEs being serviced by the base station (UE 1 data/information 444, . . . UE N data/information 446), fading diversity determination information 472, and UE scheduling data/information 474, e.g., an output of scheduler 438. UE 1 data/information 444 includes UE 1 location 447, a list of detected base station IDs 449, and a combined channel state information (CSI) report 448 including a CSI report corresponding to each base station antenna used for communications with UE 1 (CSI report (antenna 1) 450 including a channel quality indicator (CQI) value 451, . . . , CSI report (antenna n1) 452 including a channel quality indicator (CQI) value 453), and a determined UE1 overall quality value 455. CSI report 448 may, and sometimes does include individual CSI reports corresponding to multiple base stations, e.g., when one or more other base stations are operating in relay mode to for base station 400 with regard to UE 1 data transmissions.

UE N data/information 446 includes UE N location 457, a list of detected base station IDs 459, and a combined CSI report 458 including a CSI report corresponding to each base station antenna used for communications with UE N (CSI report (antenna 1) 460 including a channel quality indicator (CQI) value 461, . . . , CSI report (antenna n2) 462 including a channel quality indicator (CQI) value 463), and a determined UEN overall quality value 465. CSI report 446 may, and sometimes does include individual CSI reports corresponding to multiple base stations, e.g., when one or more other base stations are operating in relay mode to for base station 400 with regard to UE N data transmissions.

Data./information 442 further includes a minimum channel diversity threshold 466, e.g., a value used by the base station 400 in determining whether or not another base station is to be selected to operate in relay mode with regard to base station 400. Base station 400 may, and sometimes does, include information 467 identifying a selected base station for relay mode, and UE location information and UE data 468 to sent to a base station operating in relay mode. Base station 400 may, and sometimes does, include a received relay mode message 469, e.g., requesting or commanding base station 400 to operate in relay mode for another base station, information 470 identifying a set of base station 400 antennas to be reserved for relay mode, received UE data 471 that was received from a base station and which is to be transmitted to a UE as part of relay mode operation, and received UE data from another base station to be transmitted by base station 400 to th UE as part of a relay mode operation.

Figure 5A:
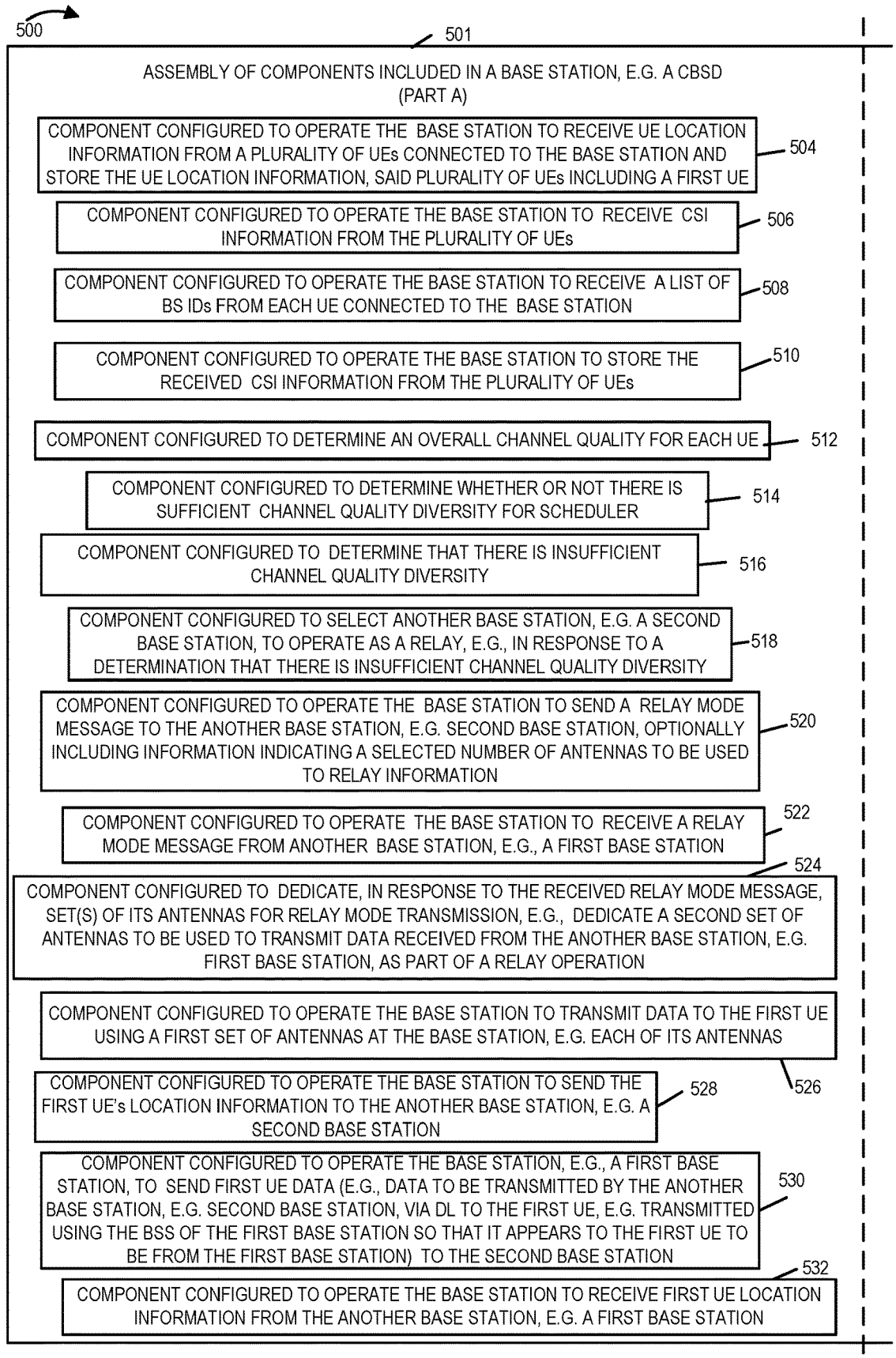
FIG. 5A is a first part of a drawing of an exemplary assembly of components which may be included in a base station, e.g. a CBSD, in accordance with an exemplary embodiment.
Figure 5B:
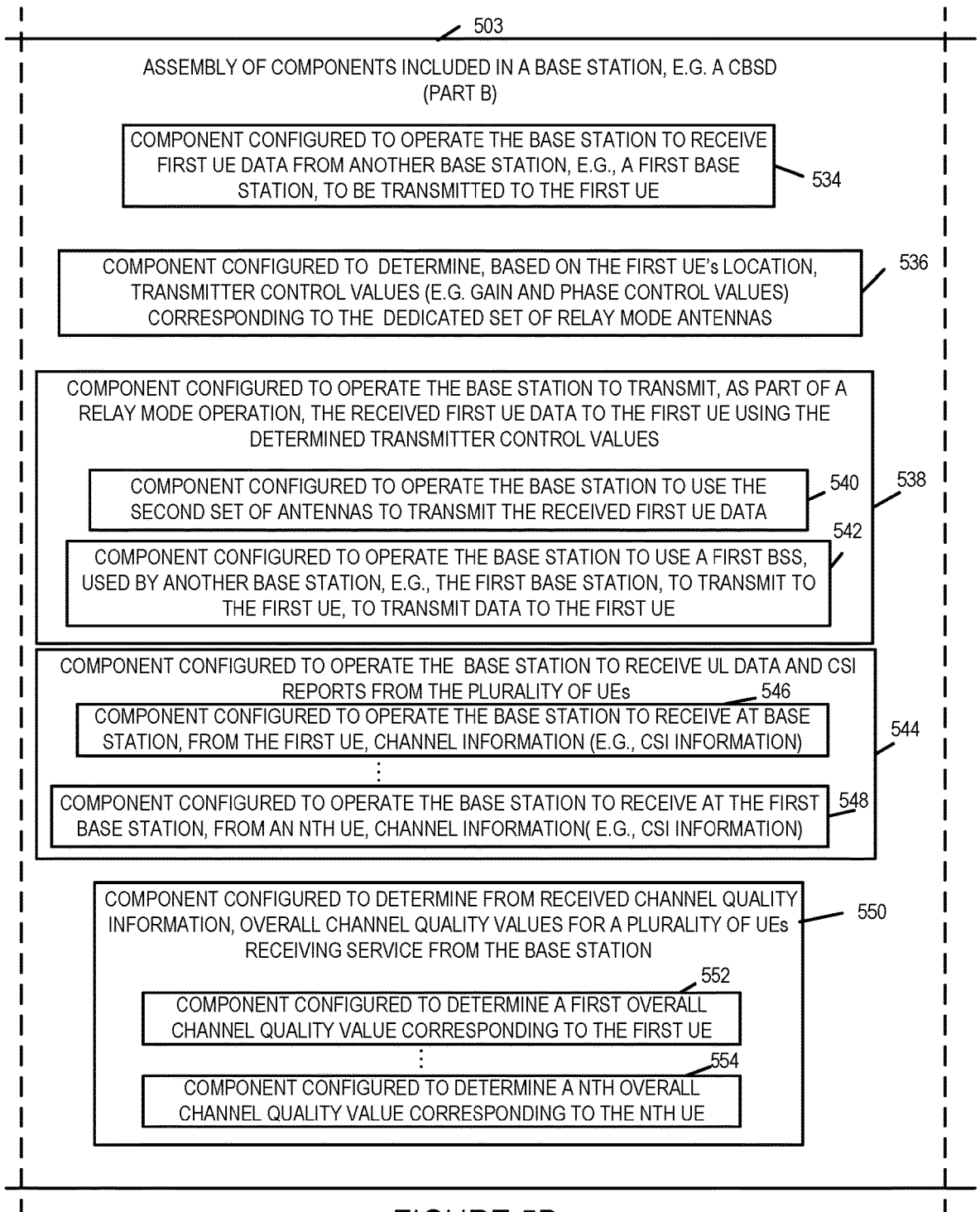
FIG. 5B is a second part of a drawing of an exemplary assembly of components which may be included in a base station, e.g. a CBSD, in accordance with an exemplary embodiment.
Figures 5, 5C:
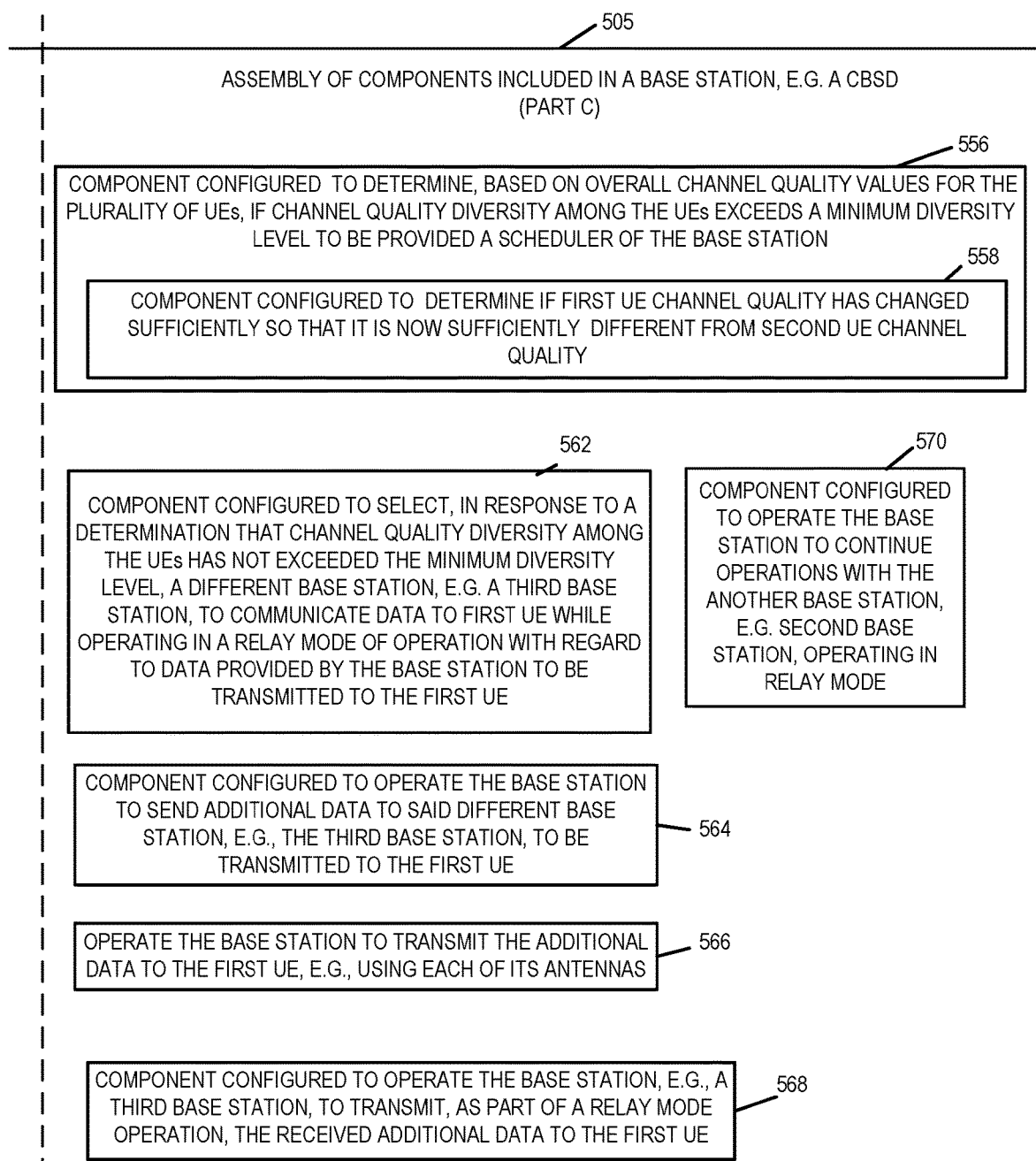
FIG. 5C is a third part of a drawing of an exemplary assembly of components which may be included in a base station, e.g. a CBSD, in accordance with an exemplary embodiment.
FIG. 5 comprises the combination of FIG. 5A, FIG. 5B and FIG. 5C.

FIG. 5, comprising the combination of FIG. 5A, FIG. 5B and FIG. 5C, is a drawing of an exemplary assembly of components 500, comprising the combination of Part A 501, Part B 503 and Part C 505, which may be included in an exemplary base station, e.g., a CBSD, in accordance with an exemplary embodiment. The exemplary base station including assembly of components 500 is, e.g., any of the base stations (base station 1 102, . . . , base station 2 104, base station M 106) of FIG. 1, CBSD 700 of FIGS. 6-11, CBSD 2 750 of FIG. 9-11, CBSD M 751 of FIG. 11, CBSD1 1302 of FIGS. 13-15, CBSD 1304 of FIGS. 13-15, a base station implementing steps of FIG. 12, a base station implementing steps of the method of flowchart 200 of FIG. 2 and/or a base station implementing the steps of the method of flowchart 300 of FIG. 3.

The components in the assembly of components 500 can, and in some embodiments are, implemented fully in hardware within a processor, e.g., processor 402, e.g., as individual circuits. The components in the assembly of components 500 can, and in some embodiments are, implemented fully in hardware within the assembly of hardware components 408, e.g., as individual circuits corresponding to the different components. In other embodiments some of the components are implemented, e.g., as circuits, within processor 402 with other components being implemented, e.g., as circuits within assembly of components 408, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 410 of the base station 400, with the components controlling operation of base station 400 to implement the functions corresponding to the components when the components are executed by a processor e.g., processor 402. In some such embodiments, the assembly of components 500 is included in the memory 410 as part of an assembly of software components 440. In still other embodiments, various components in assembly of components 500 are implemented as a combination of hardware and software, e.g., with another circuit external to the processor providing input to the processor which then under software control operates to perform a portion of a component's function.

When implemented in software the components include code, which when executed by a processor, e.g., processor 402, configure the processor to implement the function corresponding to the component. In embodiments where the assembly of components 400 is stored in the memory 410, the memory 410 is a computer program product comprising a computer readable medium comprising code, e.g., individual code for each component, for causing at least one computer, e.g., processor 402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the base station 400 or elements therein such as the processor 402, to perform the functions of corresponding steps illustrated and/or described in the method of one or more of the flowcharts, signaling diagrams and/or described with respect to any of the Figures. Thus, the assembly of components 500 includes various components that perform functions of corresponding one or more described and/or illustrated steps of an exemplary method, e.g., steps of the method of flowchart 200 of FIG. 2 and/or steps of the method of flowchart 300 of FIG. 3.

Assembly of components 500 includes a component 504 configured to operate the base station to receive UE location information from a plurality of UEs connected to the base station and store the UE location information, said plurality of UEs including a first UE, a component 506 configured to operate the base station to receive CSI information from the plurality of UEs, a component 508 configured to operate the base station to receive a list of base station IDs from each UE connected to the base station, e.g. base station IDs of which the UE has detected to be within communication range of the UE, a component 510 configured to operate the base station to store the received CSI information from the plurality of UEs, and a component 512 configured to determine an overall channel quality for each UE.

Assembly of components 500 further includes a component 514 configured to determine whether or not there is sufficient channel quality diversity for the scheduler of the base station, a component 516 configured to determine that there is insufficient channel quality diversity, e.g., the determined channel quality diversity among UEs being serviced by the base station is not greater than a minimum channel quality diversity level to satisfy the scheduler, a component 518 configured to select another base station, e.g., a second base station, to operate as a relay, e.g. in response to a determination that there is insufficient channel quality diversity, and a component 520, configured to send a relay mode message to another base station, e.g. second base station, optionally including information indicating a selected number of antennas to be used to relay information.

Assembly of components 500 further includes a component 522 configured to operate the base station to receive a relay mode message from another base station, e.g. a first base station and a component 524 configured to dedicate, in response to the received relay mode message, one or more sets of its antennas for relay mode transmission, e.g., dedicate a second set of antennas to be used to transmit data from another base station, e.g., a first base station, as part of a relay mode operation.

Assembly of components 500 further includes a component 526 configured to operate the base station to transmit data to the first UE using a first set of antennas at the base station, e.g., each of its antennas, a component 528 configured to operate the base station to send the first UE's location information to another base station, e.g. a second base station, and a component 530 configured to operate the base station, e.g., a first base station, to send first UE data (e.g., data to be transmitted by another base station, e.g. second base station, via DL to the first UE, e.g., transmitted using the BSS of the first base station so that it appears to the first UE to be from the first base station) to another base station, e.g. second base station.

Assembly of components 500 further includes a component 532 configured to operate the base station to receive first UE location information from the another base station, e.g. a first base station, a component 534 configured to operate the base station to receive first UE data from another base station, e.g., a first base station, to be transmitted to the first UE, a component 536 configured to determine, based on the first UE's location, transmitter control values (e.g., gain and/or phase control values) corresponding to the dedicated set of relay mode antennas, and a component 538 configured to operate the base station to transmit, as part of a relay mode operation, received first UE data using the determined transmitter control values. Component 538 includes a component 540 configured to operate the base station to use a second set of antennas to transmit the received first UE data, and a component 542 configured to operate the base station to uses a first BSS, used by another base station, e.g., the first base station, to transmit to the first UE, to transmit data to the first UE.

Assembly of components 500 further includes a component 544 configured to operate the base station to receive UL data and CSI reports form the plurality of UEs. Component 544 includes a component 546 configured to operate the base station to receive from the first UE channel information, e.g., channel state information (CSI), and a component 548 configured to operate the base station to receive from an Nth UE channel information, e.g., channel state information (CSI). Assembly of components 500 further includes a component 550 configured to determine from the received channel quality information, overall channel quality values for a plurality of UEs receiving service from the base station. Component 550 includes a component 552 configured to determine a first overall channel quality value corresponding to the first UE and a component 554 configured to determine an Nth overall channel quality value corresponding to an Nth UE.

Assembly of components 500 further includes a component 556 configured to determine, based on overall channel quality values for the plurality of UEs, if channel quality diversity among the UEs exceeds a minimum diversity level to be provided a scheduler of the base station. Component 556 includes a component 558 configured to determine if first UE channel quality has changed sufficiently so that it is now sufficiently different from a second UE channel quality.

Assembly of components 500 further includes a component 562 configured to select, in response to a determination that channel quality diversity among the UEs has not exceeded the minimum diversity level, a different base station, e.g. a third base station, to communicate data to the first UE while operating in relay mode of operation with regard to data provided by the base station to be transmitted to the first UE, a component 564 configured to operate the base station to send additional data to said different base station, e.g. the first base station, to be transmitted to the first UE, and a component 566 configured to operate the base station to transmit the additional data to the first UE, e.g. using each of its antennas, and a component 568 configured to operate the base station, e.g. a third base station, to transmit, as part of a relay mode operation, the received additional data to the first UE.

Assembly of components 500 further includes a component 570 configured to operate the base station to continue operations with the another base station, e.g. second base station, operating in relay mode, e.g., in response to a determination that the channel quality diversity among UEs exceeds the minimum diversity level.

Components 504, 506, 508, 510, 512, 514, 516, 518, 520, 526, 528, 530, 544, 546, 548, 550, 552, 554, 556, 558, 562, 564, 566, and 570 are used by base station 500, e.g. when base station 500 is, e.g. the first base station, performing steps of the method of flowchart 300 of FIG. 3. Components 522, 524, 532, 534, 536, 538, 540, and 542 are used by base station 500, e.g., when base station 500 is, e.g., the second base station, performing steps of the method of flowchart 300 of FIG. 3.

Various aspects and/or features of some embodiments of the present invention are described below.

An exemplary method uses 'relay mode' of CBSD to relay data sent from a different CBSD so that different channel conditions are created between the CBSD relaying the information and the UE. CBSD1 sends 'relay mode' message to CBSD2 so that CBSD2 can reserve a set of antennas to be used in relay mode.

An exemplary flow will now be described. A Citizens Broadband Radio Services Device (CBSD) turns on and registers with a Spectrum Access System (SAS). The SAS grants spectrum to the CBSD. The CBSD has a large number of antennas, e.g., 100-500 antennas, to use for massive MIMO communication. Consider that the exemplary CBSD has 100 antennas. Each user terminal, sometimes referred to as a user equipment (UE), receives data from each of the 100 antennas in time divided manner. For example, UE1 receives data from each of the 100 antennas at time=0, and UE2 receives data from each of the 100 antennas at time=1, and so on.

With a high number of antennas being used for massive MIMO, the same (or similar) RF channel conditions are experienced for each UE in the network.

Consider that there are two CBSDs, CBSD1 and CBSD2.

CBSD1 sends 'Relay mode' message to CBSD2, which reserves a small set of CBSD2 antennas for relaying the data transmission.

CBSD1 sends UE1's location to CBSD2 together with UE1's data.

When CBSD2 receives data from CBSD1, CBSD2 relays the data to UE1 using UE1's location in the network.

CBSD2 is in relay mode, and has dedicated one or two antennas to transmit UE1's data.

Since the RF channel between CBSD2 and UE1 is different than the channel condition between CBSD1 and UE1, channel diversity will be reached with different fading profile.

UE1 will send channel state information (CSI) back to CBSD1, (CBSD2 relay mode is not utilized).

If UE1's reported CSI is still similar to UE2's reported CSI, then CBSD1 will selected another CBSD other than CBSD2 for relay mode, e.g., CBSD1 selects CBSD3 for relay mode.

UL data transmission direction is still being sent from UE1 to CBSD1.

The process will continue again with the newly selected CBSD.

Figure 6:
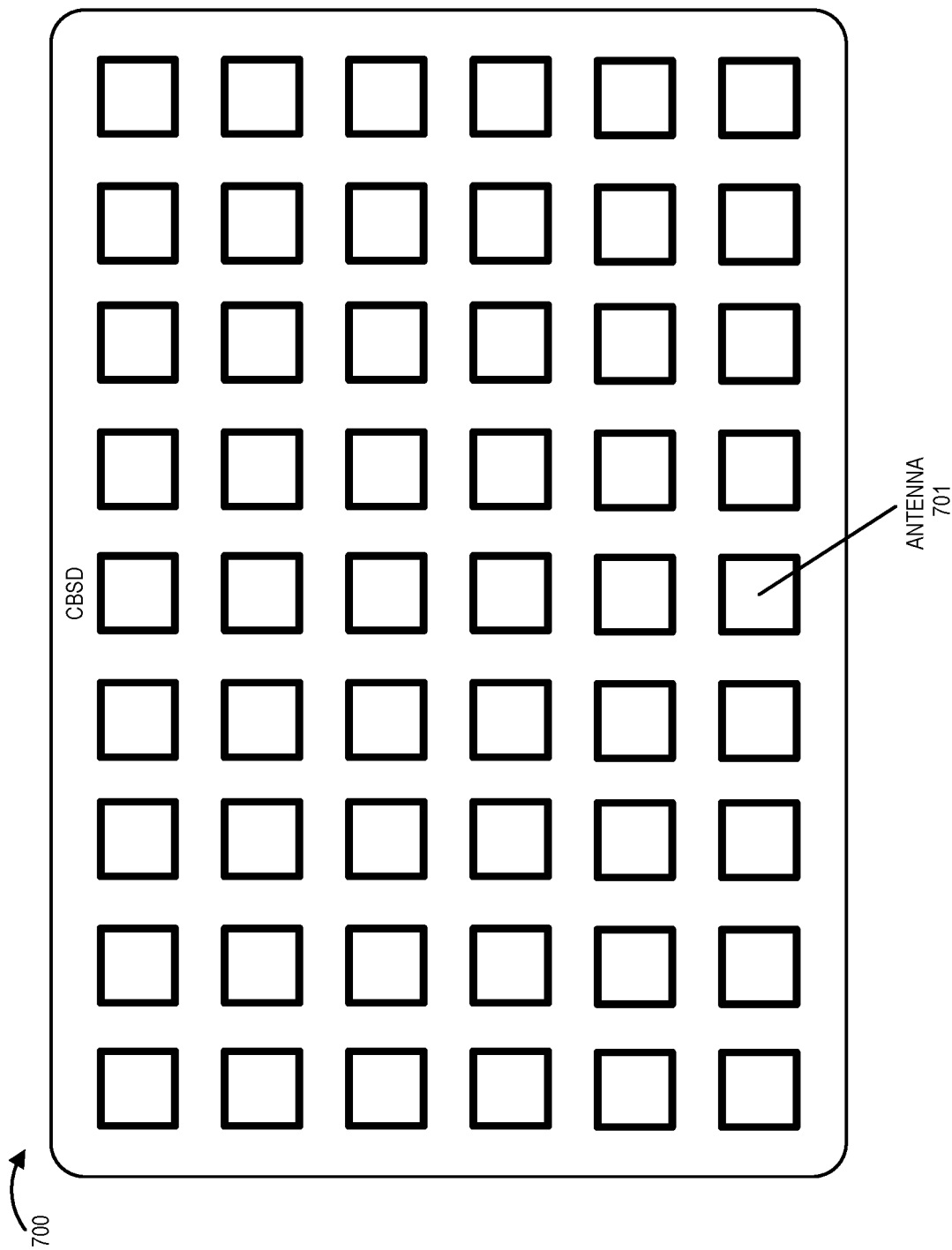
FIG. 6 is a drawing of an exemplary CSBD supporting massive MIMO, said CBSD including a plurality of antennas arranged in an array, in accordance with an exemplary embodiment.

FIG. 6 is a drawing of an exemplary CSBD 700 including a plurality of antennas (e.g., including at least 54 antennas) arranged in an array. Exemplary antenna 701 within CBSD 700 is identified. Exemplary CBSD 700 is, e.g., exemplary base station 400 of FIG. 4.

Figure 7:
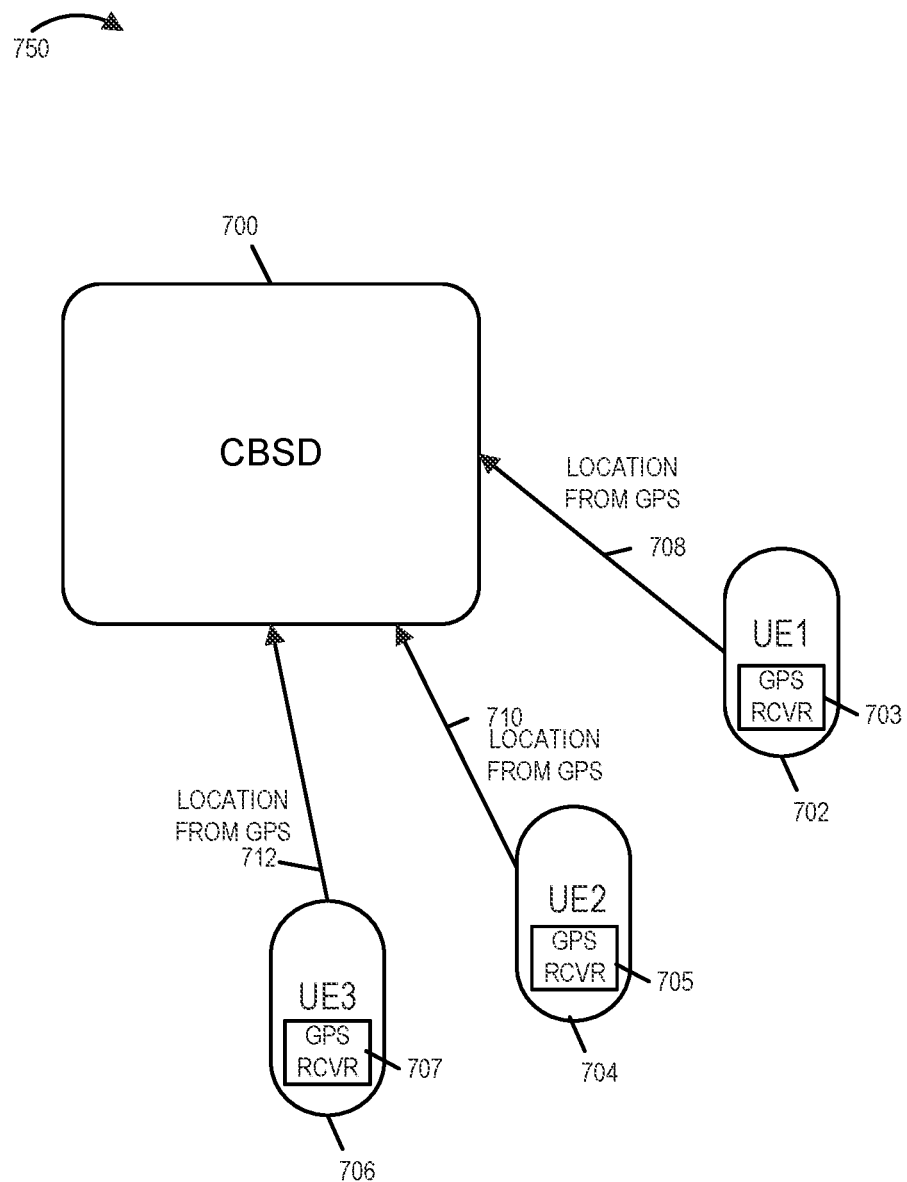
FIG. 7 is a drawing illustrating UEs reporting GPS derived location information to a CBSD in accordance with an exemplary embodiment.

FIG. 7 is a drawing 750 illustrating exemplary CBSD 700 and three exemplary wireless terminals (UE 1 702, UE 2 704, UE 3 706) which are coupled to CBSD 700 and are being served by CBSD 700. The UEs (702, 704, 706) are, e.g., any of the UEs of system 100 of FIG. 1. Each UE (UE 1 702, UE 2 704, UE 3 706) includes a GPS receiver (703, 705, 707) respectively, which receives GPS signals and determines the location of the UE. Each UE (702, 704, 706) determines its location from the received GPS signals and sends its location to the CBSD 700 in a message (708, 710, 712). The CBSD 700 receives the location information from the UEs, and stores the location information, e.g., to be used later in making decisions, e.g., regarding scheduling, transmission power levels, direction on beams, assignment of SRS values, handoffs, etc. and for providing to another CBSD which is to operate in relay mode for CBSD 700.

Figure 8:
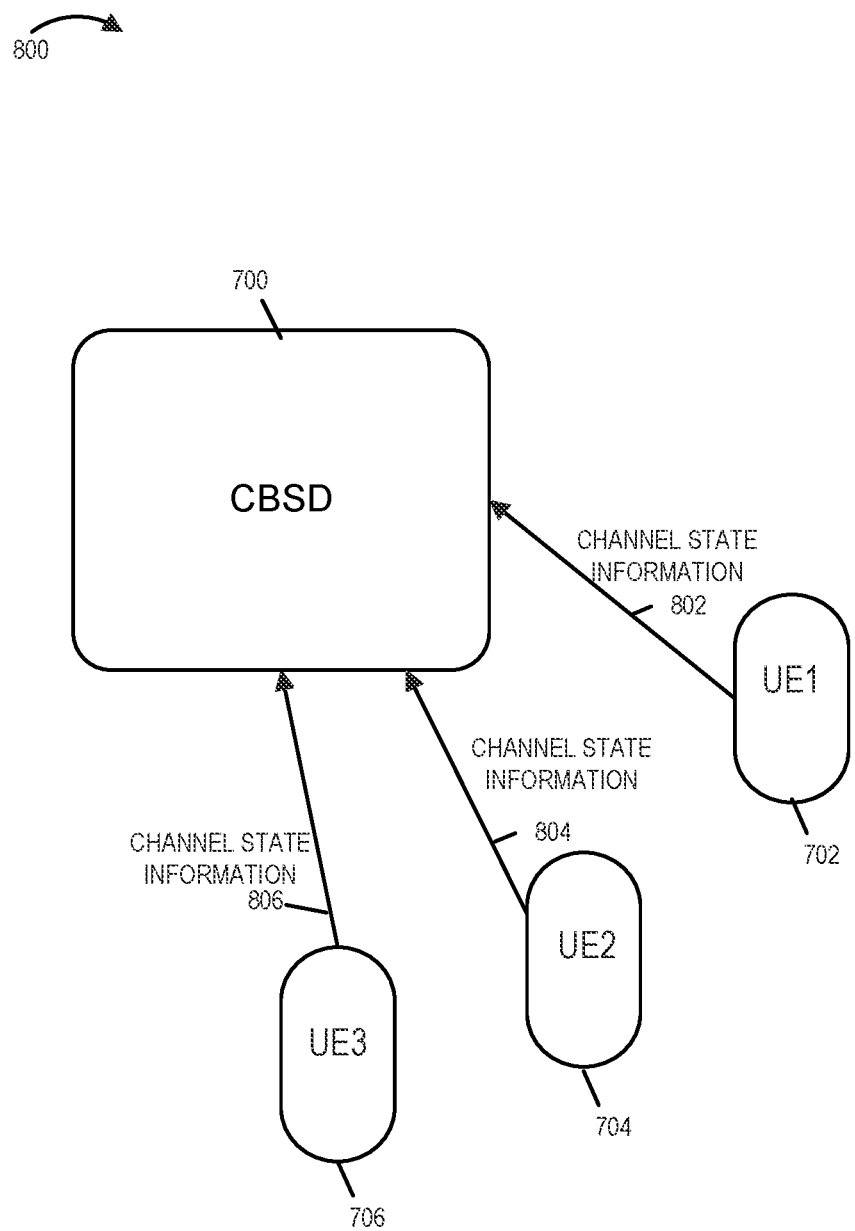
FIG. 8 is a drawing illustrating UEs reporting channel state information (CSI) to a CBSD in accordance with an exemplary embodiment.

FIG. 8 is a drawing 800 illustrating exemplary CBSD 700 receiving channel state information (802, 804, 806) from UEs (UE 1 702, UE 2 704, UE 3 706), respectively. The received channel state information is received by CBSD and stored and used to make decisions, e.g., including decisions as to whether or not to select another CBSD for relay mode, scheduling decisions, assignment of SRS values, handoffs, etc. A channel information report from a UE includes channel quality information corresponding to antennas of CBSD 700 used to communicate with the UE. A channel information report received by CBSD 700, which was sent from a UE may, and sometimes does, includes channel quality information corresponding to antennas of CBSD 700 used to transmit data to the UE and antennas corresponding to one or more additional CBSDs, operating in relay mode on behalf of CBSD 700, which are also transmitting data (sourced from CBSD 700) to the UE.

Figure 9:
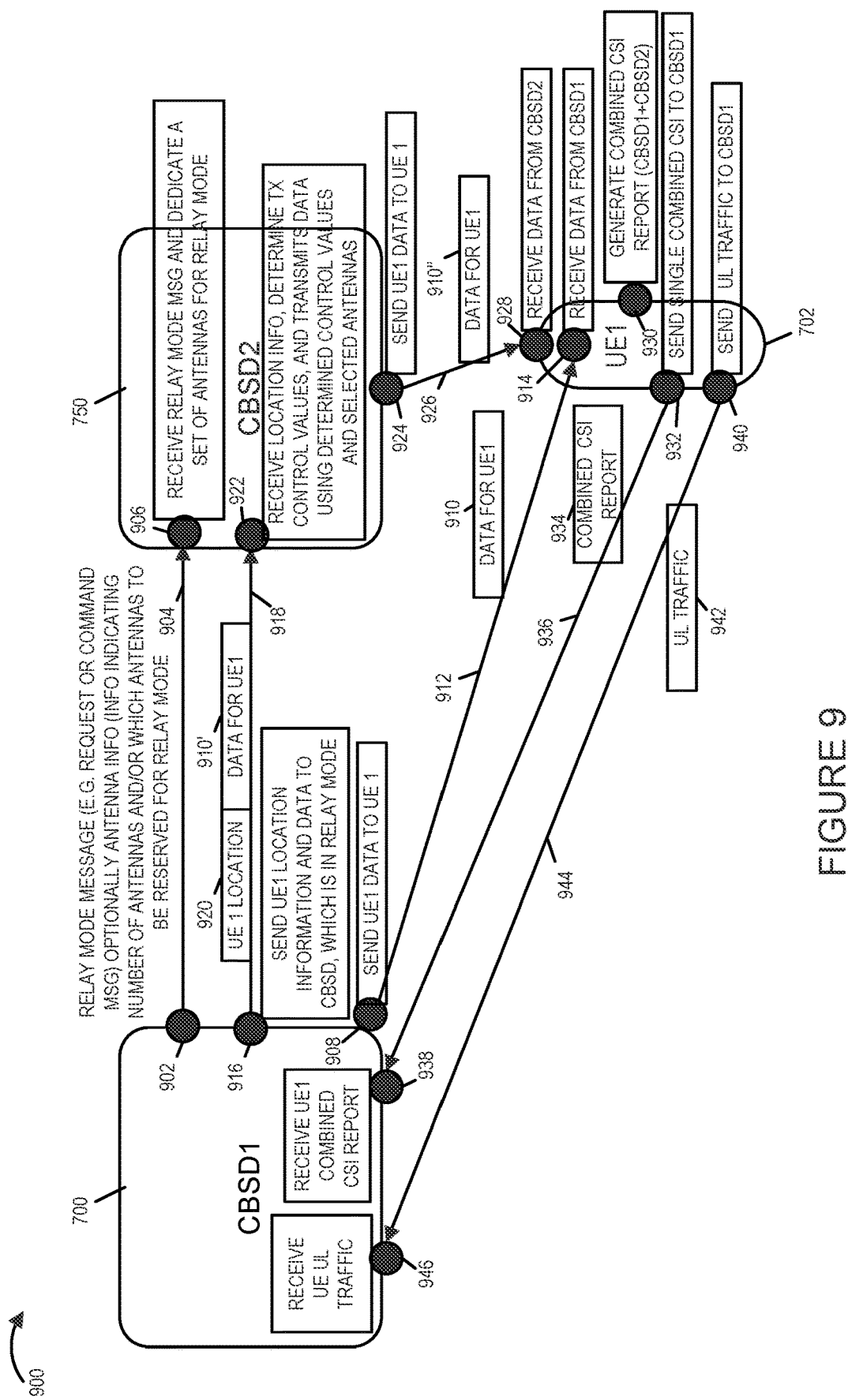
FIG. 9 is a drawing illustrating two exemplary adjacent CBSDs, which support massive MIMO, an exemplary UE, which is connected to and being serviced by a first CBSD, and exemplary signaling and operations related to relay mode operations in accordance with an exemplary embodiment.

FIG. 9 is a drawing 900 illustrating two exemplary adjacent CBSDs (CBSD 1 700, CBSD 2 750, an exemplary UE 1 702, which is connected to and being serviced by CBSD 1 700, and exemplary signaling and operations in accordance with an exemplary embodiment.

In step 902 CBSD1 700 generates and sends 'relay mode' message 904 to CBSD2 750. The relay mode message 904, e.g. a request or command message, requests or commands CBSD2 to operate in relay mode on behalf of CBSD1 700 and to reserve a subset of its antennas, e.g., a small subset of its antennas, for relay mode transmission of received UE intended data, communicated from CBSD1 to CBSD2, to UEs. In some embodiments, the relay mode message indicates a number of antennas and/or information indicating which particular antennas are to be reserved for relay mode. In some embodiments, the relay mode message indicates a number of antennas and/or information indicating which particular antennas are to be reserved for relay mode corresponding to a particular identified UE, e.g., UE 1 702. In step 906 CBSD2 750 receives the relay mode message 904 and dedicates (designates, reserves or sets aside) a set of its antennas for relay mode operations.

In step 908 CBSD1 700 transmits UE1 data 910 to UE 1 910 via wireless signals 912, sent over its set, e.g., full set of transmit antennas. In step 914 UE 1 702 receives signals 912. In step 916 CBSD 1 700 generates and sends message 918 to CBSD2 750. Message 918 includes UE 1 location information 920 and data for UE 1 910'. In step 922 CBSD 2 750 receives the location information and the UE 1 data to be transmitted, determines transmitter control values (e.g., gain and phase control values), e.g., based on the location of UE 1, and selects one or more or its dedicated relay mode antennas to be used for transmitting the UE 1 to UE 1 702. In step 924 CBSD2 750 transmits the received UE 1 data to UE 702, as signals 926 conveying data for UE 1 910", using the selected dedicated relay mode antennas of CBSD2 750. In step 928 UE 1 702 receives the signals 926 including the UE 1 data from CBSD 2 750. The received CBSD1 signals conveying UE 1 data and the received CBSD2 signals conveying UE 1 data are processed and combined to recover the underlying data being communicated to UE1 702.

In step 930 UE 1 702 generates a combined CSI report 934 including individual channel quality information, e.g. CQI values, corresponding to each of the CBSD transmit antennas from which a signal was received, which includes a large set of antennas from CBSD1 and a small set of antennas from CBSD2 (operating in relay mode). In step 932 UE 1 sends the combined CSI report 934 to CBSD1 700 via uplink signals 936. In step 938 CBSD1 700 receives the UE1 combined CSI report. In step 940 UE 1 702 generates and sends UL traffic 942 via uplink signals 944 to CBSD1 700. In step 946 CBSD 1 700 receives UL traffic signals 944 and recovers the UL traffic data 942.

Figure 10:
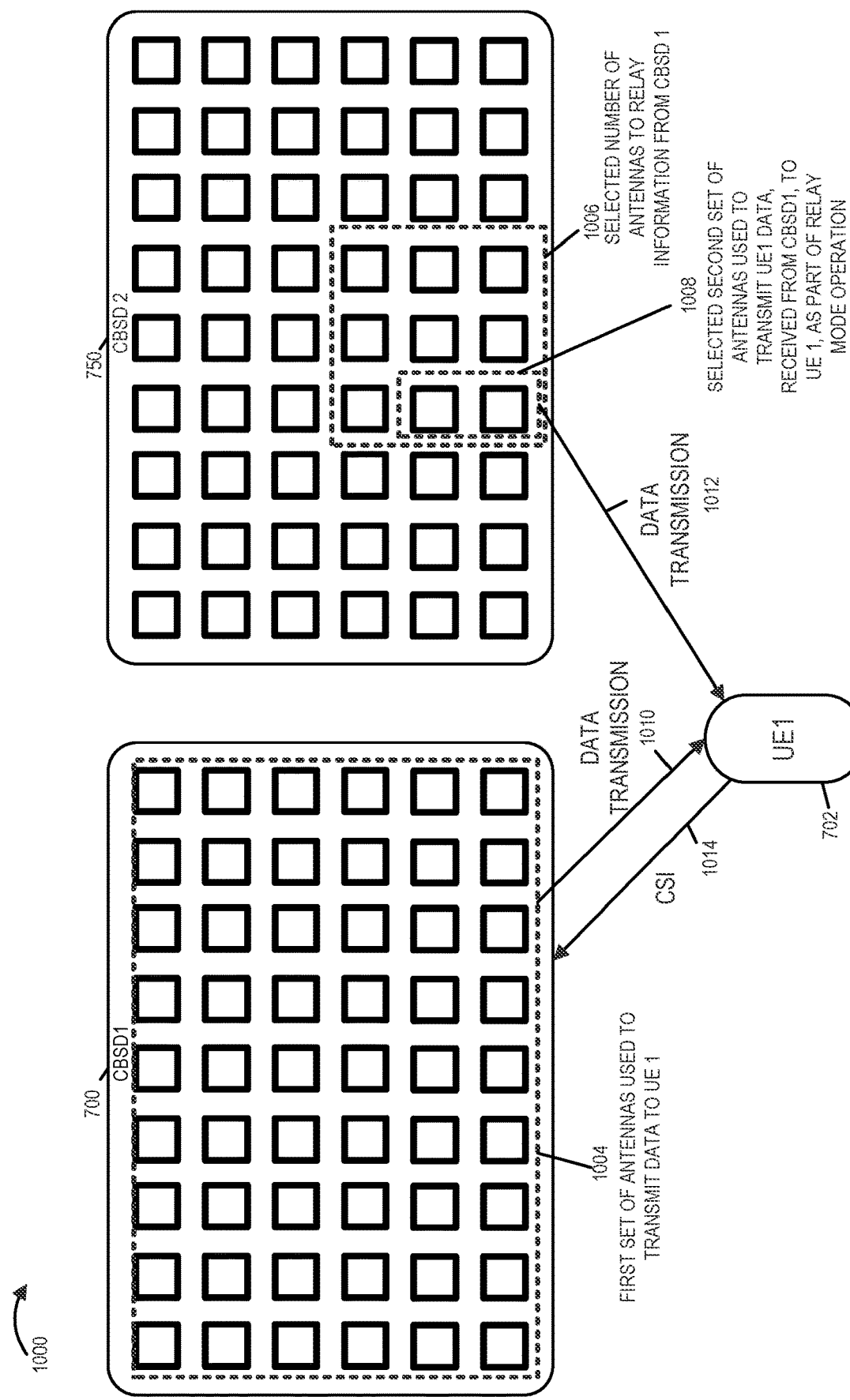
FIG. 10 is a drawing illustrating two exemplary adjacent CBSDs supporting massive MIMO, an exemplary user equipment (UE), exemplary sets of antennas and exemplary signaling (downlink transmissions and an uplink combined CSI report) related to relay mode operations in accordance with an exemplary embodiment.

FIG. 10 is a drawing 1000 illustrating two exemplary CBSDs, CBSD 1 700 and CBSD 2 750, exemplary user equipment 1 (UE 1) 702, exemplary sets of antennas and exemplary signaling in accordance with an exemplary embodiment. CBSD 1 1004 includes first set 1004 of antennas, e.g., 54 antennas, used to transmit data to UE 1 702. CBSD 2 750 is operating in relay mode on behalf of CBSD 1 700. CBSD 2 750 has reserved, e.g., dedicated a selected number, e.g., 9, of its antennas indicated by dotted block 1006 to relay information received from CBSD1 to UEs, e.g. in response to a previously received 'relay mode' message from CBSD 1 700. CSBD 2 750 has selected a second set of antennas (e.g., 2 antennas within block 1006), as indicated by dashed block 1008, to be used to transmit UE 1 data received from CBSD1 700, to UE 1 702, as part of a relay mode operation.

CBSD 1 700 transmits data via each of its antennas in first set of antennas 1004 to UE 1 as indicated by data transmission arrow 1010. CBSD 2 750, operating in relay mode, transmits data via the two antennas in second set of antennas 1008 to UE 1 as indicated by data transmission arrow 1012, e.g. using the BSS ID of CBSD 1012. UE 1 702 views the received data from both the 54 antennas of CBSD 1 700 and from the 2 antennas of CBSD 2 750 as if the signals were all transmitted from antennas of CBSD1 700. UE 1 702 generates a combined CSI report, e.g. including an individual CQI value corresponding to each transmit antenna, and send the CSI report 1014 to CBSD 1 700 which receives the report, and generates an overall channel quality value for UE1 702, based on the report, and uses the generated overall quality value in making scheduling decisions among UEs being service by CBSD 1 700.

Figure 11:
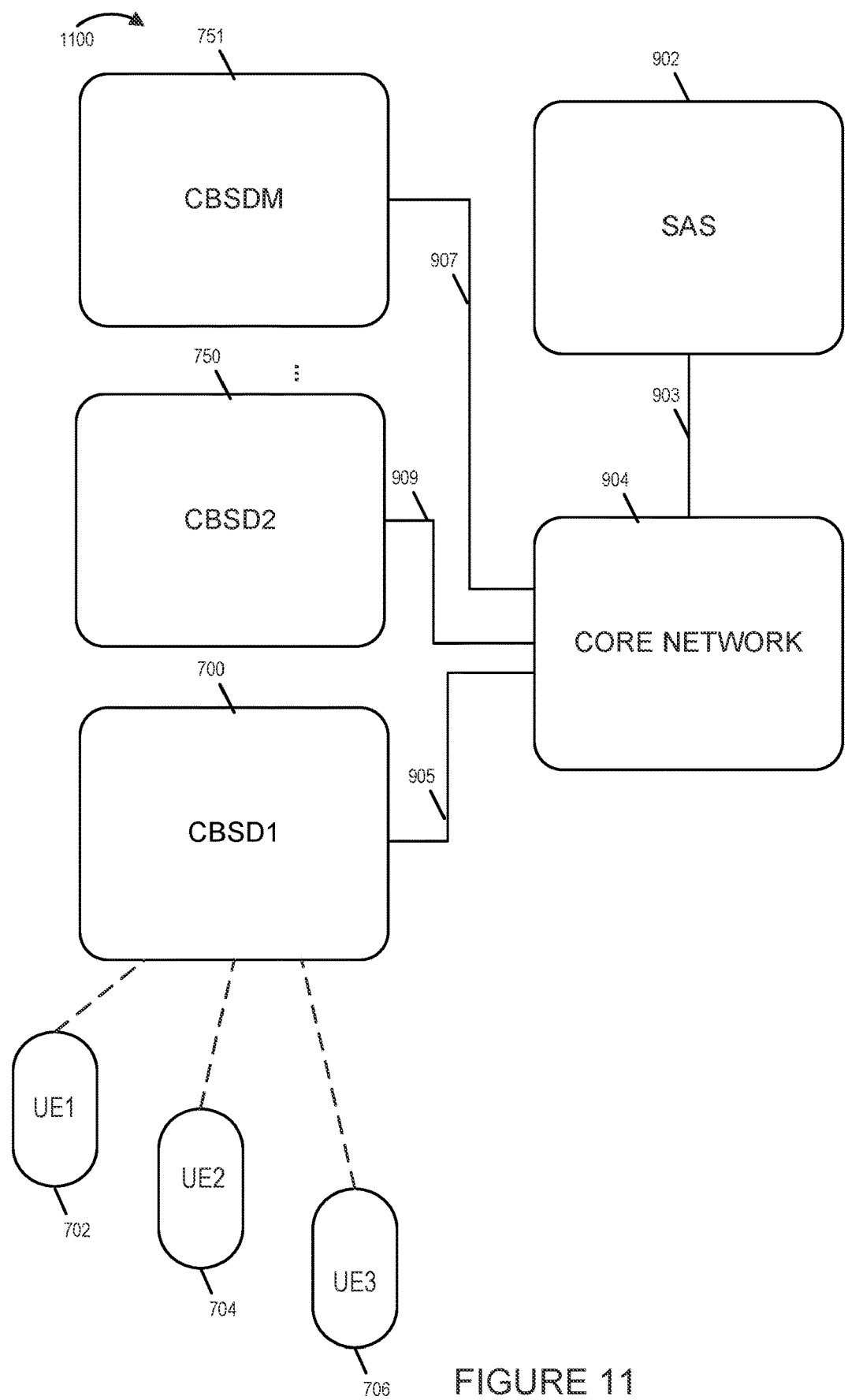
FIG. 11 is a drawing illustrating an exemplary communications system including a spectrum access system (SAS), a core network, a plurality of CBSDs implemented in accordance with an exemplary embodiment, and a plurality of UEs.

FIG. 11 is a drawing 1100 illustrating an exemplary SAS 902, exemplary core network 904, exemplary CBSD1 700, exemplary CBSD 2 750, exemplary CBSD M 751, and exemplary UEs (UE 1 702, UE 2 704, UE 3 706). SAS 902 is, e.g., SAS 108 of system 100 of FIG. 1. CBSD1 700 is coupled to SAS 902, via core network 904 and communications links 905, 903. The CBSD1 700 powers on and sends a spectrum request to SAS 902. SAS 902 grants the request and sends a spectrum allocation to CBSD 1 700. CBSD 1 700 establishes a network, e.g., including a BSS, and starts transmitting broadcast signals. CBSD 2 750 is coupled to SAS 902, via core network 904 and communications links 909, 903. The CBSD 2 750 powers on and sends a spectrum request to SAS 902. SAS 902 grants the request and sends a spectrum allocation to CBSD 2 750. CBSD 750 establishes a network, e.g., including a BSS, and starts transmitting broadcast signals. CBSD M 751 is coupled to SAS 902, via core network 904 and communications links 907, 903. The CBSD M 751 powers on and sends a spectrum request to SAS 902. SAS 902 grants the request and sends a spectrum allocation to CBSD M 751. CBSD M 751 establishes a network, e.g., including a BSS, and starts transmitting broadcast signals.

UEs (702, 704, 706), which are within range of CBSD 700 establish connections with CBSD 700 and start communicating with the CBSD, e.g. receiving paging signals, downlink control signals and downlink traffic signals. The UEs (702, 704, 706) send uplink signals to the CBSD 700, said uplink signals including: location information, channel status information, and sounding reference signal (SRS). CBSD 700 may, and sometimes does decide to send a relay mode message to another CBSD in its vicinity, said relay mode message requesting or commanding the another CBSD, e.g., CBSD 750 or CBSD 751, to operate in relay mode for CBSD 700, e.g. reserving a small set of its antennas for relay mode operation and transmitting data for a UE, received from CBSD 700, to the UE.

In one exemplary embodiment, the devices (CBSD1 700, CBSD2 750, CBSDM 751, SAS 902, UE1 702, UE2 704, UE3 706) of FIG. 11 are the devices (base station 1 102, base station 2 104, base station M 106, SAS 108, UE1A 120, UE2A 122, UENA 124) of system 100 of FIG. 1.

Figure 12:
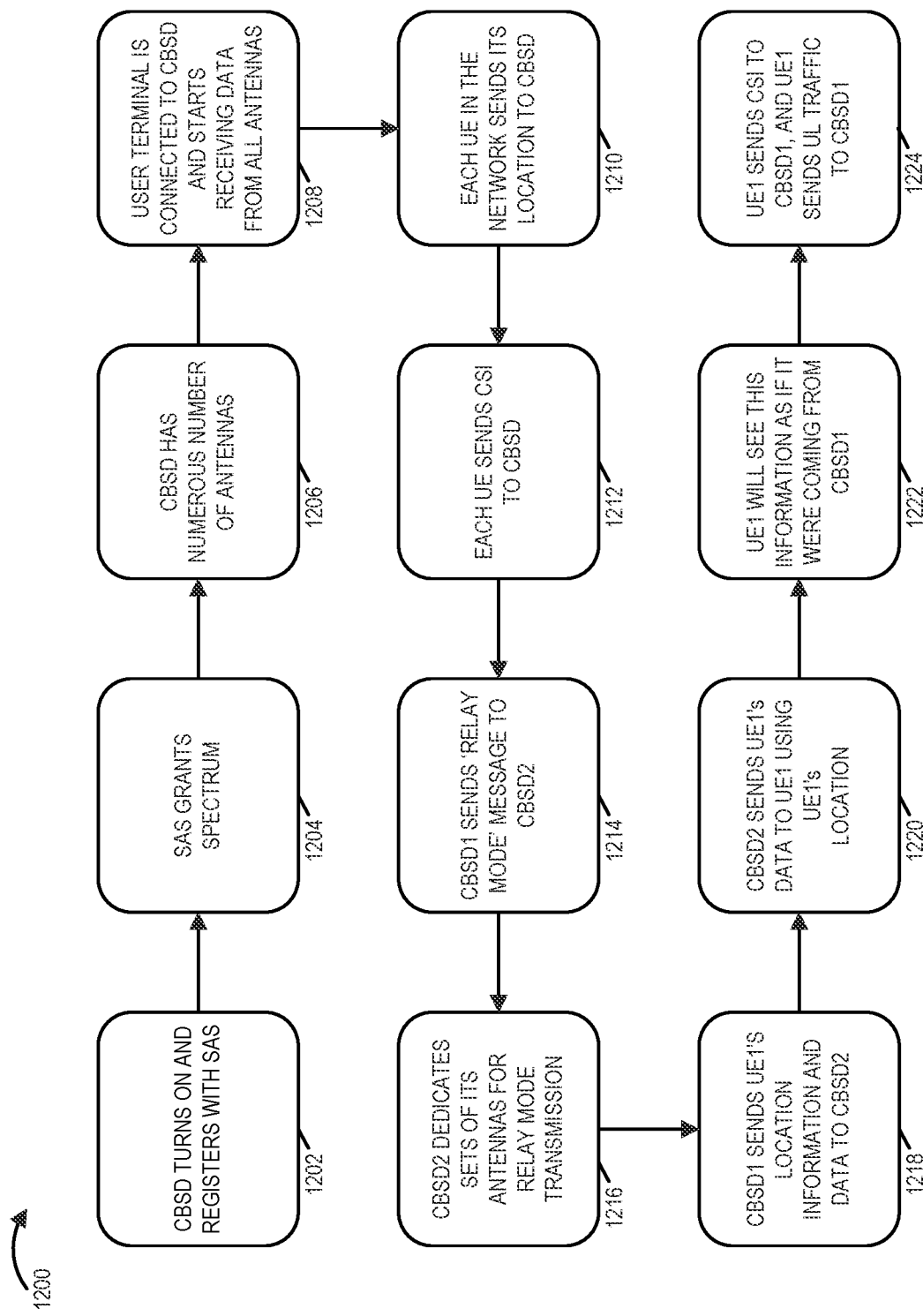
FIG. 12 is a block diagram illustrating an exemplary flow and exemplary characteristics, features and/or aspects in accordance with some embodiments.

FIG. 12 is a block diagram 1200 illustrating exemplary flow and exemplary characteristics in accordance with some embodiments. In step 1202 a CSBD turns on and registers with a SAS. In step 1204, the SAS grants spectrum to the CBSD. Block 1206 indicates that the CBSD has a numerous number of antennas, e.g., the CBSD supports massive MIMO. In step 1208 one or more user terminals (e.g., UEs) are connected to the CBSD. A UE which is connected to the CBSD starts receiving data from each of the antennas of the CBSD. In step 1210 each UE in the network (UEs connected to the CBSD), sends its location to the CBSD, e.g., in response to a paging message. In step 1212 each UE sends channel state information (CSI) to the CBSD, e.g., each UE sends a CSI report including channel quality information, e.g. a CQI value, corresponding to each of the CBSD antennas. In step 1214 CBSD1 generates and sends a 'Relay Mode' message to the CBSD2. In step 1216 CBSD2 dedicates sets of its antennas for relay mode transmission. In step 1218 CBSD1 send UE1's location information and data to CBSD2. In step 1220 CBSD2 operating in relay mode, sends (transmits) UE's data to UE1 using UE1's location (e.g., UE's location is used to set transmitter gain and phase control values). In step 1222 UE 1 receives the transmitted signals from CBSD 2, operating in relay mode, and sees this information as if it was coming from CBSD1 (e.g., the BSS ID corresponding to CBSD1 is used by CBSD2 when transmitting the data to UE 1 in relay mode). UE 1 has also received signals from the antennas of CBSD1 communicating the data. UE 1 recovers the data being communicated to UE 1 by processing and combining received signals transmitted from the many CBSD1 antennas and from the received signals transmitted from the few dedicated relay mode CBSD2 antennas. In step 1224 UE 1 sends a combined CSI report to CBSD1 and also sends UL traffic to CBSD1.

Figure 13:
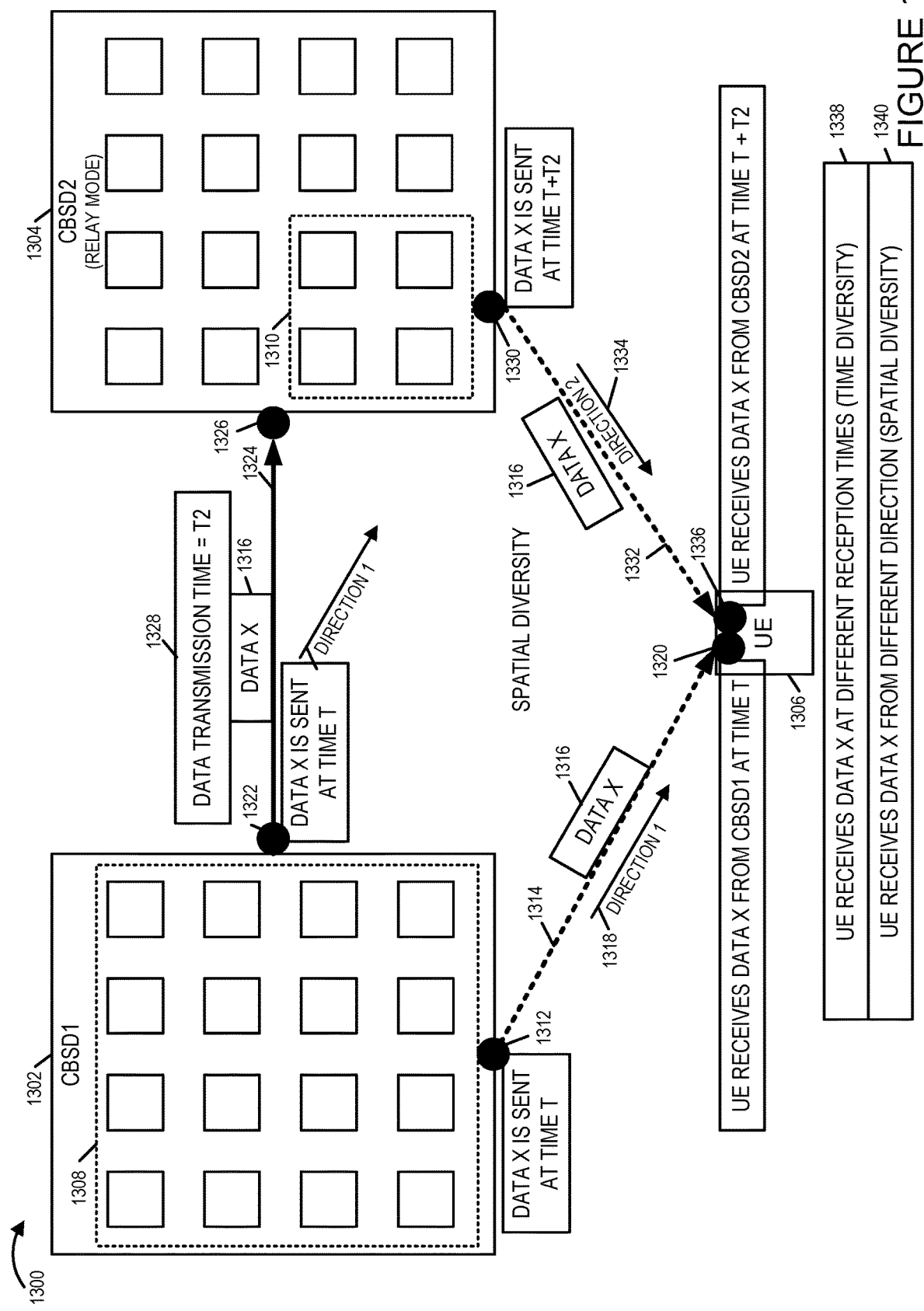
FIG. 13 is a drawing illustrating time and spatial diversity in an exemplary embodiment in which two CBSDs are used to communicate data to a UE device in accordance with an exemplary embodiment.

FIG. 13 is a drawing 1300 illustrating the general concept of time and spatial diversity in an exemplary embodiment in which two CBSDs, CBSD1 1302 and CBSD2 1304, are used to communicate data (data X) to a UE device 1306 in accordance with an exemplary embodiment. CBSD1 1302 and CBSD2 1304 support massive MIMO operations and relay mode functionality in accordance with an exemplary embodiment. CBSD1 1302 and CBSD2 1304 each include at least 16 antennas, represented by square boxes within the CBSDs.

Consider that CBSD1 1302 has previously sent a relay mode message to CBSD2 1302, requesting or commanding CBSD2 1304 to operate in relay mode for CBSD1 1302, with regard to transmitting received data from CBSD1 to one or more UEs. CBSD2 1304, in response to the received relay mode message, has reserved antenna block 1310, which is a subset of four antennas of its set of 16 antennas, for relay mode transmissions to UE(s) on behalf of CBSD1 1302.

In step 1312, CBSD1 1302 transmits, at time T, wireless signals 1314 to UE 1306 conveying data X 1316, via each of the 16 antennas in antennas set 1308. The general direction of the transmission paths from CBSD1 1302 to UE 1306 is direction 1 1318. In step 1320 UE 1306 receives data X 1316 from CBSD1 1302 at time T. Data X 1316 has been communicated over 16 wireless channels from CBSD1 to UE 1306, one channel for each antenna of antenna block 1308 of CBSD 1 1302.

In step 1322, CBSD1 1302 sends, at time T, signals 1324 conveying data X 1316 to CBSD2 1304, e.g., via network interfaces and a cable and/or fiber optic network path. In this example the data transmission time from CBSD1 1302 to CBSD2 1304 is T2. In step 1326, at time (T+T2), CBSD2 1304 receives data X 1316. In step 1330 at time (T+T2), CBSD2 1304 transmits signals 1332 conveying data X 1316, via each of its 4 antennas in relay mode antenna block 1310. The general direction of the transmission paths from CBSD2 1304 to UE 1306 is direction 2 1334. In step 1336 UE 1306 receives data X 1316 from CBSD2 at time (T+T2). Data X 1316 has been communicated over 4 wireless channels from CBSD2 1304 to UE 1306, one channel for each antenna of antenna block 1310 of CBSD 2 1302.

In this example, the wireless transmission time between a CBSD and the UE is not considered as it is substantially less than the transmission time (T2) 1328 between the CBSDs.

In this example, it is shown that UE 1306 receives data X from the two different CBSDs (1302, 1304) at different reception times (T, T+T2), which represents time diversity, as indicated by block 1338. In this example, it is also shown that UE 1306 receives data X from the two different CBSDs (1302, 1304) from two different directions (direction 1 1318, direction 2 1334), which represents spatial diversity, as indicated by block 1340

Figure 14:
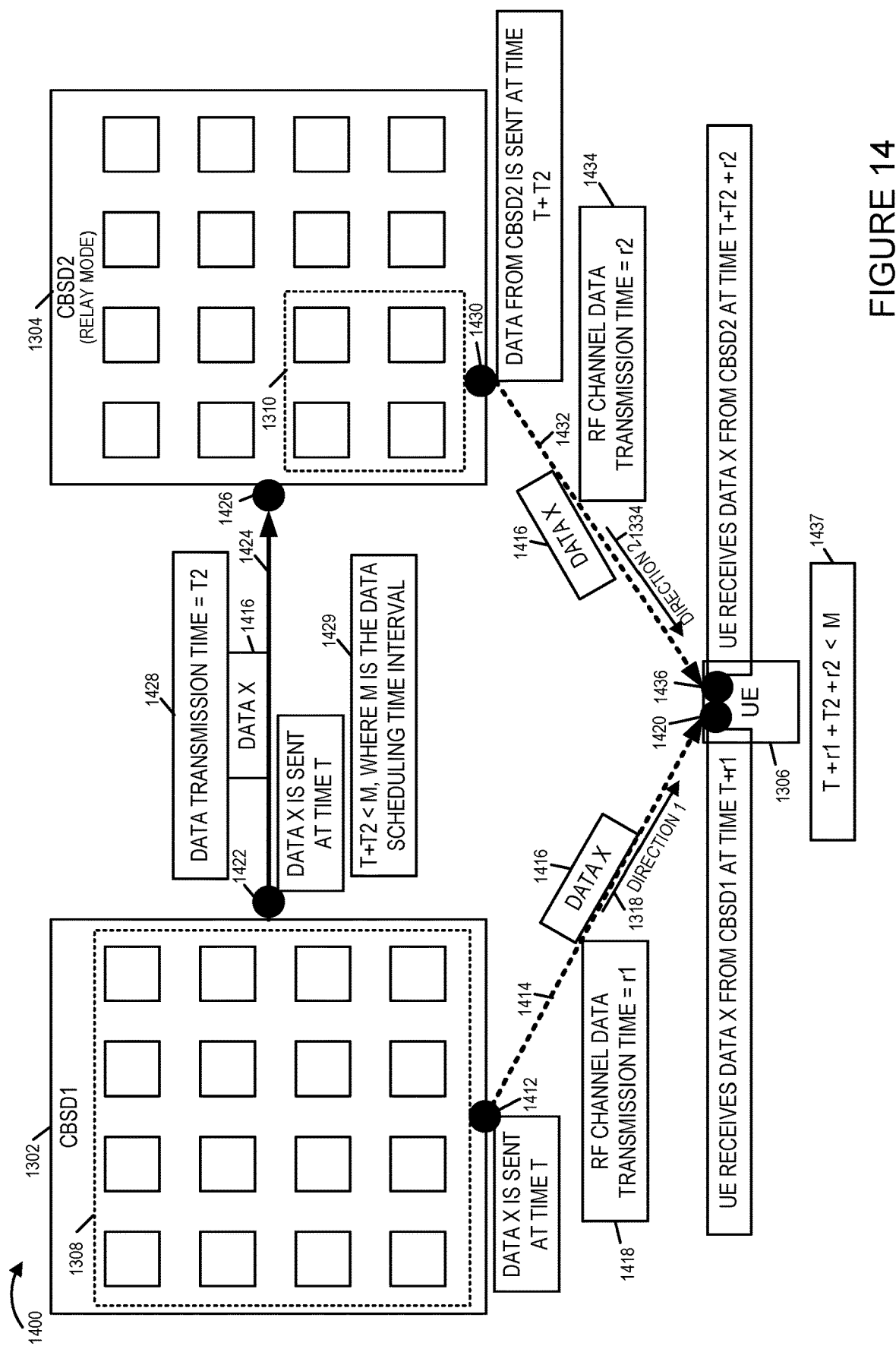
FIG. 14 is a drawing illustrating time and spatial diversity in an exemplary embodiment in which two CBSDs are used to communicate data to a UE device and further illustrates exemplary signaling timing, transmission delays, and timing constraints in accordance with an exemplary embodiment.

FIG. 14 is a drawing 1400 illustrating time and spatial diversity in an exemplary embodiment in which two CBSDs (CBSD1 1302 and CBSD2 1304) are used to communicate data to a UE device 1306 and further illustrates exemplary timing and scheduling timing constraints in accordance with an exemplary embodiments. CBSD1 1302 and CBSD2 1304 support massive MIMO operations and relay mode functionality in accordance with an exemplary embodiment. CBSD1 1302 and CBSD2 1304 each include at least 16 antennas, represented by square boxes within the CBSDs.

Consider that CBSD1 1302 has previously sent a relay mode message to CBSD2 1304, requesting or commanding CBSD2 1304 to operate in relay mode for CBSD1 1302, with regard to transmitting received data from CBSD1 to one or more UEs. CBSD2 1304, in response to the received relay mode message, has reserved antenna block 1310, which is a subset of four antennas of its set of 16 antennas, for relay mode transmissions to UE(s) on behalf of CBSD1 1302.

For the example, consider that M is the scheduling time interval, and scheduling of UEs, by the scheduler of CBSD1 1302 occurs at time 0, time M, time 2M, time 3M, etc. In step 1412, CBSD1 1302 transmits, at time T wireless signals 1414 to UE 1306 conveying data X 1316, via each of the 16 antennas in antennas set 1308. The general direction of the transmission paths from CBSD1 1302 to UE 1306 is direction 1 1318. The RF channel data transmission time for wireless transmissions from CBSD1 1302 to UE 1306 is r1, as indicated by block 1418. In step 1420 UE 1306 receives data X 1416 from CBSD1 1302 at time (T+r1). Data X 1416 has been communicated over 16 wireless channels from CBSD1 to UE 1306, one channel for each antenna of antenna block 1308 of CBSD 1 1302.

In step 1422, CBSD1 1302 sends, at time T, signals 1424 conveying data X 1416 to CBSD2 1304, e.g., via network interfaces and a cable and/or fiber optic network path. In this example the data transmission time from CBSD1 1302 to CBSD2 1304 is T2 1428. In step 1426, at time (T+T2), CBSD2 1304 receives data X 1316. One time constraint for this exemplary embodiment is that T+T2<M, as indicated by block 1429.

In step 1430 at time (T+T2), CBSD2 1304 transmits signals 1432 conveying data X 1416, via each of its 4 antennas of relay mode antenna block 1310. The general direction of the transmission paths from CBSD2 1304 to UE 1306 is direction 2 1334. In step 1436 UE 1306 receives data X 1416 from CBSD2 1304 at time (T+T2+r2). The RF channel data transmission time for wireless transmissions from CBSD2 1304 to UE 1306 is r2, as indicated by block 1434. Data X 1416 has been communicated over 4 wireless channels from CBSD2 1304 to UE 1306, one channel for each antenna of antenna block 1310 of CBSD 2 1304. Another time constraint for this exemplary embodiment is that T+r1+T2+r2<M, as indicated by block 1437.

In this example, it is shown that UE 1306 receives data X from the two different CBSDs (1302, 1304) at different reception times (T+r1, T+T2+r2), which represents time diversity. In this example, it is also shown that UE 1306 receives data X from the two different CBSDs (1302, 1304) from two different directions (direction 1 1318, direction 2 1334), which represents spatial diversity.

Figure 15:
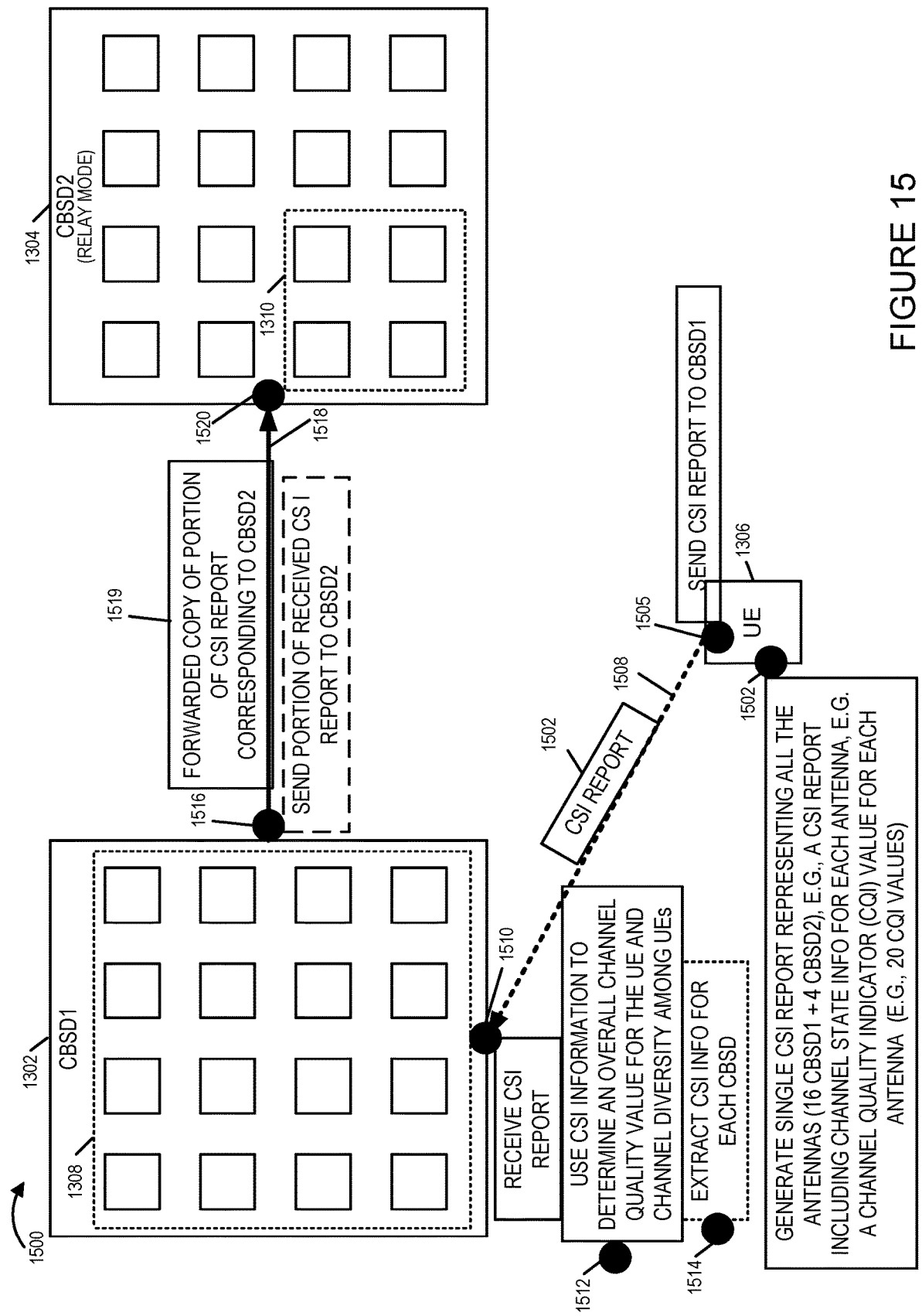
FIG. 15 is a drawing illustrating exemplary channel quality reporting including a single channel state information (CSI) report being sent from a UE to a first CBSD, said single CSI report being a composite report communicating channel state information between both: i) the first CBSD and the UE and ii) a second CBSD, operating in relay mode, and the UE in accordance with an exemplary embodiment.

FIG. 15 is a drawing 1500 illustrating exemplary channel quality reporting including a single channel state information report 1502 being sent from a UE 1306 to a first CBSD 1302, said single CSI report 1502 being a composite report communicating channel state information between both i) the first CBSD 1302 and the UE 1306 and ii) a second CBSD 1304, operating in relay mode, and the UE 1306 in accordance with an exemplary embodiment.

Consider that the example of FIG. 15, is a continuation of the example of FIG. 14. In step 1502 UE 1306 generates, based on the received downlink transmission of data X 1416 from CBSD 1 1302 and CBSD2 1304, a single CSI report 1502 representing all the antennas (16 antennas of antenna block 1308 of CBSD1 1302+4 antennas of antenna block 1310 of CBSD2 1304), e.g. a composite CSI report including channel state information for each of the 20 antennas, e.g., a channel quality indicator (CQI) value and/or other channel state information value(s) for each antenna. In step 1505 UE 1306 transmits uplink signals 1508 conveying composite CSI report 1502 to CBSD1 1304. In step 1510, CBSD1 1302 receives CSI report 1502 and recovers the communicated information. CBSD1 1302 also receives CSI reports from other UEs to which it is providing service. In step 1512, CBSD1 1302 uses the received CSI information from CSI report 1502 to determine and overall channel quality value for UE 1306 and in determining channel quality diversity among UEs being serviced by the CBSD, e.g., to determine if channel quality diversity among the UEs exceeds a minimum threshold for the scheduler.

In some embodiments, optional step 1514, 1516 and 1520 are performed. In step 1514, CBSD1 1304 extracts channel state information from combined CSI report 1502 for each CBSD. In step 1516 CBSD1 1302 sends signals 1518 to CBSD2 1304. Signals 1518 convey a forwarded copy 1519 of the portion of combined CSI report 1502 which corresponds to CBSD2 1304. In step 1520 CBSD2 1304 receives signals 1518 and recovers the CSI corresponding to the channels between the antennas of antenna block 1308 of CBSD2 1304 and UE 1306.

In some embodiments, the devices (CBSD1 1302, CBSD2 1304, UE 1306) of FIGS. 13-15 are the devices (base station 1 102, base station 2 104, UE1A 120) of system 100 of FIG. 1.

Numbered List of Exemplary Method Embodiments

Method Embodiment 1. A communications method, the method comprising: sending (232 or 320) from a first base station (e.g., a Citizens Broadband Radio Services Device (CBSD) base station) a relay mode message to a second base station (e.g., a message requesting or commanding the second base station to reserve a set of antennas for relaying data provided by the first base station); sending data (238 or 330) from the first base station to the second base station to be transmitted to a first UE (e.g., using the BSS of the first base station so that it appears to the UE to be from the first base station); transmitting data (236 or 326) from the first base station to the first UE using a first set of antennas at the first base station; and receiving (256 or 346) at the first base station, from the first UE, channel information (e.g., CSI information).

Method Embodiment 2. The method of Method Embodiment 1, wherein said first UE channel information is based on the transmission of the data to the first UE from the first base station and the transmission of the data to the first UE from the second base station.

Method Embodiment 2AA. The method of Method Embodiment 1 further comprising: operating the second base station to receive (234 or 322) the relay mode message from the first base station; and dedicating (235 or 324), in response to the relay mode message, a second set of antennas to be used to transmit data from the first base station as part of a relay operation.

Method Embodiment 2A. The method of Method Embodiment 1, further comprising: receiving (242 or 344) at the second base station the data from the first base station to be transmitted to the first UE; and transmitting, (246 or 338) from the second base station, as part of a relay mode operation, the received data to the first UE.

Method Embodiment 2B. The method of Method Embodiment 2A wherein said first and second base stations are spaced apart from one another, said transmission of the data from the second base station in addition to the transmission from the first base station providing communications channel spatial diversity.

Method Embodiment 2C. The method of Method Embodiment 2B, wherein said step of transmitting, (246 or 338) from the second base station, as part of a relay mode operation, the received data to the first UE is performed at a time that is different from the time at which said data is transmitted from the first base station thereby providing temporal channel diversity in addition to spatial channel diversity.

Method Embodiment 2D. The method of Method Embodiment 2C wherein the time between the transmission of the data to the first UE from the first base station and second base station is less than the time interval used by the first base station to schedule sets of UEs for data transmission with data transmission in a scheduled set of UEs to be performed in a sequential manner.

Method Embodiment 2E. The method of Method Embodiment 2D, wherein said first and second base station (and the third base station) are base stations with physically adjacent coverage areas; and wherein the first UE is a UE in an edge area between the first and second base stations (e.g., the first base station selects as a relay base station a base station the first UE indicated it was able to receive signals from, e.g. BSIDs, e.g., as indicated by a list of BSIDs that the first UE reported to the first base station in optional step 223 or 308 or based on a list of base stations determined from the location of the first UE and with the first base station selecting (231 or 318) from the list of BSIDs or BSs which BS should be used as a relay to the first UE).

Method Embodiment 2A1 The method of Method Embodiment 2A wherein transmitting, (246 or 338) from the second base station, as part of a relay mode operation, the received data to the first UE includes using (247 or 340) the second set of antennas to transmit the received data.

Method Embodiment 2A2. The method of Method Embodiment 2A1, further comprising: operating the second base station to receive (241 or 332) location information from the first base station indicating the location of the first UE; and determining (244 or 336) based on the received location information transmitter control values used to control the gain and/or phase of data signals when transmitting data to the first UE.

Method Embodiment 2B1. The method of Method Embodiment 2A, wherein transmitting, (246 or 338) from the second base station, as part of a relay mode operation, the received data to the first UE includes: operating (248 or 342) the second base station to use a first BSS used by the first base station to transmit to the first UE, to transmit said data to the first UE; and wherein said first BSS is different from a second BSS used by said second base station to transmit to UEs to which said second base station provides service.

Method Embodiment 2C1. The method of Method Embodiment 1, wherein the first set of antennas includes all or the majority of transmitter antennas at the first base station.

Method Embodiment 2D1. The method of Method Embodiment 2C1 where the second set of antennas includes less antennas than the first set of antennas and includes at most a fraction of transmitter antennas available at the second base station.

Method Embodiment 2E1. The method of Method Embodiment 2D1 wherein the first set of antennas includes at least ¾ of the transmitter antennas at the first base station; and wherein the second set of antennas includes ¼ or less of the transmitter antennas at the second base station, said second set of antennas being reserved for use in relaying data from the first base station.

Method Embodiment 2F. The method of Method Embodiment 2A, further comprising: operating the first base station to communicate (237 or 328) first UE location information to the second base station; and operating the second base station receive (241 or 332) the first UE location information.

Method Embodiment 3. The method of Method Embodiment 2, further comprising: determining (258 or 350), from received channel quality information, overall channel quality values for a plurality of UEs receiving service from the first base station; and determining (260 or 356), based on the overall channel quality values for the plurality of UEs, if channel quality diversity among the UEs exceeds a minimum diversity level to be provided a transmission scheduler in the first base station (e.g., channel diversity as indicated by the size of the range of overall channel quality values being over a predetermined minimum level used to support scheduling).

Method Embodiment 4. The method of Method Embodiment 3, further comprising: in response to determining that the channel quality diversity among the UEs does not exceed a minimum diversity level to be provided a transmission scheduler: selecting (264 or 362) a different base station (e.g., a third base station) to communicate data to the first UE while operating in a relay mode of operation with regard to data provided by the first base station to be transmitted to the UE.

Method Embodiment 4A. The method of Method Embodiment 4, further comprising: sending (266 or 364) additional data to said different base station to be transmitted to the UE (e.g., while operating in relay mode with regard to the transmission of the additional data); and transmitting (268 or 366), from the first base station, to the first UE said additional data.

Method Embodiment 4B. The method of Method Embodiment 4A, further comprising: transmitting (270 or 368), from said different base station, to the first UE said additional data.

Numbered List of Exemplary System Embodiments

System Embodiment 1. A communications system (100) comprising: a first base station (e.g., first CBSD) (102) including: a network transmitter (478 of 102); a first set of antennas (1308); and a first processor (402 of 102) configured to: operate the first base station (102) to send (232 or 320) (via network transmitter 478) from the first base station (e.g., a Citizens Broadband Radio Services Device (CBSD) base station) a relay mode message to a second base station (104) (e.g., a message requesting or commanding the second base station to reserve a set of antennas for relaying data provided by the first base station); operate the first base station (102) to send (via network transmitter (478)) data (238 or 330) from the first base station (102) to the second base station (104) to be transmitted to a first UE (120) (e.g., using the BSS of the first base station so that it appears to the UE to be from the first base station); operate the first base station (102) to transmit data (236 or 326) from the first base station (102) to the first UE (120) using the first set of antennas (1208) at the first base station (102); and operate the first base station (102) to receive (256 or 346) at the first base station (102), from the first UE (120), channel information (e.g., CSI information).

System Embodiment 2. The system (100) of System Embodiment 1, wherein said first UE channel information is based on the transmission of the data to the first UE (120)

from the first base station (102) and the transmission of the data to the first UE (120) from the second base station (104).

System Embodiment 2AA. The system (100) of System Embodiment 1 further comprising: said second base station (e.g., a second CBSD) (104) including: a network receiver (476 or 104); a second set of antennas (1310); and a second processor (402 of 104) configured to: operate the second base station (104) to receive (234 or 322) (via network receiver 476) the relay mode message from the first base station (102); and dedicate (235 or 324), in response to the relay mode message, said second set of antennas (1310) to be used to transmit data from the first base station (102) as part of a relay operation.

System Embodiment 2A. The system (100) of System Embodiment 1, wherein said second processor (402 of 104) is further configured to: operate the network receiver (476) to receive (242 or 344) at the second base station (104) the data from the first base station (102) to be transmitted to the first UE (120); and operate the second base station (104) to transmit, (246 or 338) from the second base station (104), as part of a relay mode operation, the received data to the first UE (120).

System Embodiment 2B. The system (100) of System Embodiment 2A wherein said first and second base stations (102, 104) are spaced apart from one another, said transmission of the data from the second base station (104) in addition to the transmission of the data from the first base station (102) providing communications channel spatial diversity.

System Embodiment 2C. The system (100) of System Embodiment 2B, wherein said step of transmitting, (246 or 338) from the second base station (104), as part of a relay mode operation, the received data to the first UE (120) is performed at a time that is different from the time at which said data is transmitted from the first base station (102) thereby providing temporal channel diversity in addition to spatial channel diversity.

System Embodiment 2D. The system of System Embodiment 2C wherein the time between the transmission of the data to the first UE (120) from the first base station (102) and second base station (104) is less than the time interval used by the first base station (102) to schedule sets of UEs (120, 122, . . . , 124) for data transmission with data transmission in a scheduled set of UEs to be performed in a sequential manner.

System Embodiment 2E. The system of System Embodiment 2D, wherein said first base and second base stations (102, 104) (and the third base station 106) are base stations with physically adjacent coverage areas; and wherein the first UE (120) is a UE in an edge area between the first and second base stations (e.g., the first base station selects as a relay base station a base station the first UE indicated it was able to receive signals from, e.g. BSIDs, e.g., as indicated by a list of BSIDs that the first UE reported to the first base station in optional step 223 or 308 or based on a list of base stations determined from the location of the first UE and with the first base station selecting (231 or 318) from the list of BSIDs or BSs which BS should be used as a relay to the first UE).

System Embodiment 2A1 The system (100) of System Embodiment 2A wherein said second processor (402 of 104) is configured to: use (247 or 340) the second set of antennas (1310) to transmit the received data, as part of being configured to operate the second base station (104) to transmit, (246 or 338) from the second base station (104), as part of a relay mode operation, the received data to the first UE (120).

System Embodiment 2A2. The system (100) of System Embodiment 2A1, wherein said second processor (402 of 104) is further configured to: operate the second base station (104) to receive (241 or 332) (via the network receiver 476) location information from the first base station (102) indicating the location of the first UE (120); and determine (244 or 336) based on the received location information transmitter control values used to control the gain and/or phase of data signals when transmitting data to the first UE (120).

System Embodiment 2B1. The system (100) of System Embodiment 2A, wherein said second processor (402 of 104) is configured to: operate (248 or 342) the second base station (104) to use a first BSS, used by the first base station (102), to transmit to the first UE (120), to transmit said data to the first UE (120), as part of being configured to operate the second base station (104) to transmit (246 or 338), as part of a relay mode operation, the received data to the first UE (120); and wherein said first BSS is different from a second BSS used by said second base station (104) to transmit to UEs (126, 128, 130) to which said second base station (104) provides service.

System Embodiment 2C1. The system (100) of System Embodiment 1, wherein the first set of antennas (1008) includes all or the majority of transmitter antennas at the first base station (102).

System Embodiment 2D1. The system (100) of System Embodiment 2C1 where the second set of antennas (1010) includes less antennas than the first set of antennas (1008) and includes at most a fraction of transmitter antennas available at the second base station (1004).

System Embodiment 2E1. The system (100) of System Embodiment 2D1, wherein the first set of antennas (1008) includes at least ¾ of the transmitter antennas at the first base station (102); and wherein the second set of antennas (1010) includes ¼ or less of the transmitter antennas at the second base station (1004), said second set of antennas (1010) being reserved for use in relaying data from the first base station (102).

System Embodiment 2F. The system (100) of System Embodiment 2A, wherein said first processor (402 of 102) is further configured to: operate the first base station (102) to communicate (237 or 328) (via the network transmitter 478) first UE location information to the second base station (104); and wherein said second processor (402 of 104) is further configured to operate the second base station (104) to receive (241 or 332) (via network receiver 476) the first UE location information.

System Embodiment 3. The system (100) of System Embodiment 2, wherein said first processor (402 of 102) is further configured to: determine (258 or 350), from received channel quality information, overall channel quality values for a plurality of UEs (120, 122, . . . , 124) receiving service from the first base station (102); and determine (260 or 356), based on the overall channel quality values for the plurality of UEs, if channel quality diversity among the UEs exceeds a minimum diversity level to be provided a transmission scheduler (438) in the first base station (102) (e.g., channel diversity as indicated by the size of the range of overall channel quality values being over a predetermined minimum level used to support scheduling).

System Embodiment 4. The system (100) of System Embodiment 3, wherein said first processor (402 of 102) is further configured to: select (264 or 362), in response to determining that the channel quality diversity among the UEs (120, 122, . . . , 124) does not exceed a minimum diversity level to be provided a transmission scheduler, a different base station (e.g., a third base station) (106) to communicate data to the first UE (120) while operating in a relay mode of operation with regard to data provided by the first base station (102) to be transmitted to the first UE (120).

System Embodiment 4A. The system (102) of System Embodiment 4, wherein said first processor (402 of 102) is further configured to: operate the first base station (102) to send (266 or 364) (via network transmitter 478) additional data to said different base station (106) to be transmitted to the UE (120) (e.g., while operating in relay mode with regard to the transmission of the additional data); and operate the first base station (102) to transmit (268 or 366), (via the first set of antennas 1008) from the first base station (102), to the first UE (120) said additional data.

System Embodiment 4B. The system (100) of System Embodiment 4A, further comprising: said different base station (e.g., a third CBSD) (106) including: a third processor (402 of 106) configured to: operate the different base station (106) to transmit (270 or 368), from said different base station (106), to the first UE (120) said additional data.

Numbered List of Exemplary Non-Transitory Computer Readable Medium Embodiments

Non-Transitory Computer Readable Medium Embodiment 1. A non-transitory computer readable medium (410) including computer executable instructions which when executed by a processor (402) of a first base station (400) (e.g. CBSD base station) cause the first base station (400) to perform the steps of: sending (232 or 320) from the first base station (e.g., a Citizens Broadband Radio Services Device (CBSD) base station) a relay mode message to a second base station (e.g., a message requesting or commanding the second base station to reserve a set of antennas for relaying data provided by the first antenna); sending data (238 or 330) from the first base station to the second base station to be transmitted to a first UE (e.g., using the BSS of the first base station so that it appears to the UE to be from the first base station); transmitting data (236 or 326) from the first base station to the first UE using a first set of antennas at the first base station; and receiving (256 or 346) at the first base station, from the first UE, channel information (e.g., CSI information).

Various embodiments are directed to apparatus, e.g., base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
sending from a first base station a relay mode message to a second base station, said relay mode message commanding the second base station to reserve a set of antennas at the second base station for relaying data to a first UE, said relay mode message including information indicating a number of antennas to be reserved and particular antennas at the second base station that the second base is to reserve for relaying data to the first UE;
sending data from the first base station to the second base station to be transmitted to the first UE;
transmitting data from the first base station to the first UE using a first set of antennas at the first base station; and
receiving at the first base station, from the first UE, channel information.

2. The method of claim 1,
wherein the relay mode message further includes information identifying the first UE for which the set of antennas is to be reserved; and
wherein said first UE channel information is based on the transmission of the data to the first UE from the first base station and the transmission of the data to the first UE from the second base station.

3. The method of claim 1,
wherein the first and second base stations are Citizens Broadband Radio Services Devices (CBSDs); and
wherein the indicated number of antennas number of antennas to be reserved at the second base station is less than a number of antennas to be used at the first base station to transmit data to the first UE; and
wherein the method further comprises:
operating the second base station to receive the relay mode message from the first base station; and
dedicating, in response to the relay mode message, a second set of antennas to be used to transmit data from the first base station as part of a relay operation.

4. The method of claim 1, further comprising:
receiving at the second base station the data from the first base station to be transmitted to the first UE; and
transmitting, from the second base station, as part of a relay mode operation, the received data to the first UE.

5. The method of claim 4, wherein said first and second base stations are spaced apart from one another, said transmission of the data from the second base station in addition to the transmission from the first base station providing communications channel spatial diversity; and
wherein said step of transmitting, from the second base station, as part of a relay mode operation, the received data to the first UE is performed at a time that is different from the time at which said data is transmitted from the first base station thereby providing temporal channel diversity in addition to spatial channel diversity.

6. The method of claim 5 wherein the time between the transmission of the data to the first UE from the first base station and second base station is less than the time interval used by the first base station to schedule sets of UEs for data transmission with data transmission in a scheduled set of UEs to be performed in a sequential manner.

7. The method of claim 6,
wherein said first and second base station are base stations with physically adjacent coverage areas; and
wherein the first UE is a UE in an edge area between the first and second base stations.

8. The method of claim 4, wherein transmitting, from the second base station, as part of a relay mode operation, the received data to the first UE includes:
operating the second base station to use a first BSS used by the first base station to transmit to the first UE, to transmit said data to the first UE; and
wherein said first BSS is different from a second BSS used by said second base station to transmit to UEs to which said second base station provides service.

9. The method of claim 2, further comprising:
determining, from received channel quality information, overall channel quality values for a plurality of UEs receiving service from the first base station; and
determining, based on the overall channel quality values for the plurality of UEs, if channel quality diversity among the UEs exceeds a minimum diversity level to be provided a transmission scheduler in the first base station.

10. The method of claim 9, further comprising:
in response to determining that the channel quality diversity among the UEs does not exceed a minimum diversity level to be provided a transmission scheduler:
selecting a different base station to communicate data to the first UE while operating in a relay mode of operation with regard to data provided by the first base station to be transmitted to the UE.

11. The method of claim 10, further comprising:
sending additional data to said different base station to be transmitted to the UE; and
transmitting, from the first base station, to the first UE said additional data.

12. A communications system comprising:
a first base station including:
a network transmitter;
a first set of antennas; and
a first processor configured to:
operate the first base station to send, from the first base station, a relay mode message to a second base station, said relay mode message commanding the second base station to reserve a set of antennas at the second base station for relaying data to a first UE, said relay mode message including information indicating a number of antennas to be reserved and particular antennas at the second base station that the second base is to reserve for relaying data to the first UE;
operate the first base station to send data from the first base station to the second base station to be transmitted to the first UE;
operate the first base station to transmit data from the first base station to the first UE using the first set of antennas at the first base station; and
operate the first base station to receive at the first base station, from the first UE, channel information.

13. The system of claim 12,
wherein the relay mode message further includes information identifying the first UE for which the set of antennas is to be reserved; and
wherein said first UE channel information is based on the transmission of the data to the first UE from the first base station and the transmission of the data to the first UE from the second base station.

14. The system of claim 12,
wherein the first and second base stations are Citizens Broadband Radio Services Devices (CBSDs); and
wherein the indicated number of antennas number of antennas to be reserved at the second base station is less than a number of antennas to be used at the first base station to transmit data to the first UE; and
wherein the system further comprises:
said second base station including:
a network receiver;
a second set of antennas; and
a second processor configured to:
operate the second base station to receive the relay mode message from the first base station; and
dedicate, in response to the relay mode message, said second set of antennas to be used to transmit data from the first base station as part of a relay operation.

15. The system of claim 12, wherein said second processor is further configured to:
operate the network receiver to receive at the second base station the data from the first base station to be transmitted to the first UE; and
operate the second base station to transmit, from the second base station, as part of a relay mode operation, the received data to the first UE.

16. The system of claim 15 wherein said first and second base stations are spaced apart from one another, said transmission of the data from the second base station in addition to the transmission of the data from the first base station providing communications channel spatial diversity.

17. The system of claim 13, wherein said first processor is further configured to:
   determine, from received channel quality information, overall channel quality values for a plurality of UEs receiving service from the first base station; and
   determine, based on the overall channel quality values for the plurality of UEs, if channel quality diversity among the UEs exceeds a minimum diversity level to be provided a transmission scheduler in the first base station.

18. The system of claim 17, wherein said first processor is further configured to:
   select, in response to determining that the channel quality diversity among the UEs does not exceed a minimum diversity level to be provided a transmission scheduler, a different base station to communicate data to the first UE while operating in a relay mode of operation with regard to data provided by the first base station to be transmitted to the first UE.

19. The system of claim 18, wherein said first processor is further configured to:
   operate the first base station to send additional data to said different base station to be transmitted to the UE;
   operate the first base station to transmit, from the first base station, to the first UE said additional data; and
   wherein said system further comprising:
   said different base station including:
      a third processor configured to:
         operate the different base station to transmit, from said different base station, to the first UE said additional data.

20. A non-transitory computer readable medium including computer executable instructions which when executed by a processor of a first base station cause the first base station to perform the steps of:
   sending from the first base station a relay mode message to a second base station, said relay mode message commanding the second base station to reserve a set of antennas at the second base station for relaying data to a first UE, said relay mode message including information indicating a number of antennas to be reserved and particular antennas at the second base station that the second base is to reserve for relaying data to the first UE;
   sending data from the first base station to the second base station to be transmitted to the first UE;
   transmitting data from the first base station to the first UE using a first set of antennas at the first base station; and
   receiving at the first base station, from the first UE, channel information.

* * * * *